US012782726B2

(12) United States Patent
Bove, Jr. et al.

(10) Patent No.: US 12,782,726 B2
(45) Date of Patent: Nov. 3, 2026

(54) INTERACTION METHODS AND SYSTEMS FOR A HEAD-UP DISPLAY

(71) Applicant: Adeia Guides Inc., San Jose, CA (US)

(72) Inventors: V. Michael Bove, Jr., Wrentham, MA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 1047 days.

(21) Appl. No.: 17/706,775

(22) Filed: Mar. 29, 2022

(65) Prior Publication Data

US 2023/0314801 A1 Oct. 5, 2023

(51) Int. Cl.

| | |
|---|---|
| ***G02B 27/01*** | (2006.01) |
| ***B60K 35/10*** | (2024.01) |
| ***B60K 35/23*** | (2024.01) |
| ***B60K 35/25*** | (2024.01) |
| ***G01C 21/36*** | (2006.01) |
| ***G06F 3/0482*** | (2013.01) |

(52) U.S. Cl.

CPC .......... *G02B 27/0103* (2013.01); *B60K 35/10* (2024.01); *B60K 35/23* (2024.01); *B60K 35/25* (2024.01); *G01C 21/365* (2013.01); *G06F 3/0482* (2013.01); *G02B 2027/014* (2013.01); *G02B 2027/0141* (2013.01)

(58) Field of Classification Search

CPC .......... G02B 27/0103; G02B 2027/104; G02B 2027/0141; G01C 21/365; G06F 3/0482

USPC .......... 359/13

See application file for complete search history.

(56) References Cited

U.S. PATENT DOCUMENTS

| | | | | |
|---|---|---|---|---|
| 7,680,574 | B2 | 3/2010 | Berg et al. | |
| 2006/0161861 | A1* | 7/2006 | Holecek | G06F 16/904 715/796 |
| 2012/0206484 | A1* | 8/2012 | Hauschild | B60R 16/0236 345/173 |
| 2013/0047079 | A1* | 2/2013 | Kroeger | G06F 3/0485 715/273 |
| 2013/0111407 | A1* | 5/2013 | Mullen | G06F 8/61 715/834 |
| 2018/0074667 | A1* | 3/2018 | Karunamuni | G06F 3/0485 |
| 2022/0179220 | A1* | 6/2022 | Hoover | H04N 13/156 |

* cited by examiner

*Primary Examiner* — Sharrief I Broome
(74) *Attorney, Agent, or Firm* — HG LAW LLP

(57) ABSTRACT

Systems and methods for controlling a head-up display are disclosed. A head-up display including a plurality of graphical elements, each graphical element being generated at one of a range of depths on the head-up display is generated on a head-up display device. An indication that one of the graphical elements is currently selected is displayed. A user interface navigation signal to rotate the selection through the graphical elements in order of depth in response to user actuation of a navigation control is received from a user input device and an action associated with the currently selected graphical element in response to user actuation of the user input device is performed.

20 Claims, 24 Drawing Sheets

INTERACTION METHODS AND SYSTEMS FOR A HEAD-UP DISPLAY

BACKGROUND

The present disclosure relates to methods and systems for controlling a head-up display and, more particularly, to systems and related processes for interaction mechanisms between a user input device and a head-up display, optionally located in a vehicle or user-wearable device.

SUMMARY

While head-up displays have been used in automotive applications for many years, they typically create a single plane of visual information at a fixed perceived depth ahead of the user, for example, as a holographic image in the windscreen.

Accordingly, a typical head-up display (e.g., a multiplanar display, holographic display, or a semi-translucent display) arranges visual information on a single plane, that enables the user to see, in the same field of view of their current action, the visual information. The head-up display of the present disclosure comprises a plurality of graphical elements stacked at respective perceived depths (from a user's perspective) providing an additional degree of freedom in layout. When combined with the disclosed user interface navigation methods, the present disclosure enables the user to navigate through depth planes in a head-up display and easily indicate a choice to the apparatus and see which choice is currently selected without being distracted from the display. Such displays may be deployed in fixed, wearable, mobile devices, or automotive applications. If a head-up display for a user is paired with a scroll wheel (e.g., a scroll wheel on a watch, on a mobile device, on a remote control, on a ring, on a fob, or a steering wheel) then the scroll wheel can be used in a natural-feeling way to navigate among and select items such as streaming sources, songs, text messages, alerts/notifications, weather forecasts, and other items stacked in depth.

Demonstrations of head-up displays in automotive applications have typically been driving-focused, for example placing alphanumeric information on a plane in the driver's field of view and then locating navigation arrows or hazard alerts on the road farther ahead. However, it is desirable to use head-up displays for non-driving-related user interfaces as well, for example selecting songs, streaming content, radio stations, or climate control, given that there would be no need for users to take their eyes off the road and look at a dashboard screen. In addition, the multiple depth planes are used for efficient navigation among choices to find a selection.

In view of the foregoing, the present disclosure provides systems and related methods that provide a head-up display (e.g., a multiplanar display, holographic display, or a translucent display) that shows a set of selectable items (e.g. songs, items of streaming content, messages, vehicle information, real-world objects, or the like), each selectable item located on a separate depth plane, and a user input device (e.g., a scroll wheel, stepped input mechanism, or touchpad) is used to navigate through the set and select a desired item.

In a first approach, there is provided a method for providing a user interface. A plurality of graphical elements are generated for display on the heads-up display. For example, a graphical element may comprise a plurality of pixels arrayed in a two-dimensional matrix displaying information for the user, that is generated on a plane of the user's field of view. Each plane of the display is at a different perceived depth to a user, sometimes referred to as a depth plane. For example, each graphical element is arranged such that, from a user's perspective, each graphical element, or group of graphical elements, has a perceived depth that is different to the next. Accordingly, each graphical element is generated at one of a range of perceived depths on the head-up display. An indication that one of the graphical elements is currently selected is displayed. For example, a plane can be highlighted with a marker; a change to, for example, color, contrast, brightness, or the like; a visual non-static indication, such as blinking, flashing, or the like. A user input device, such as a wheel or the like, in communication with the heads-up display, generates an interaction signal, when operated by the user, that is received by the head-up display device (more particular a transceiver or controller of the head-up display device). The user interface navigation signal that is received progresses the selection through the graphical elements in order of depth in response to user actuation of a navigation control. An action associated with the currently selected graphical element is performed in response to user actuation of an activation control of the user input device.

In some examples, a current context of the nearest graphical element is determined.

In some examples, method further comprises selecting a first plane comprising at least one graphical element to be designated the position of a selectable item. In some examples, the method further comprises receiving a selection signal, from the user input device, of a graphical element on said designated plane. For example, the user may wish to interact with a particular graphical element (or group of graphical elements) and can do so by cycling through (e.g., rotating through) the graphical elements until a desired graphical element is in the interactive or selectable item position. The user can then interact with the graphical element in this position (e.g., a first given plane). In some examples, the method further comprises, in response to receiving the selection signal, entering a sub-menu of the graphical element. For example, the currently selected graphical element may be a music element that, upon selection, allows the user to select a particular artist or song.

In some examples, the number of graphical elements to be generated is greater than a number of displayable graphical elements on the head-up display, and rotating the selection through the graphical elements' planes comprises selecting a subset of the plurality of graphical elements to be displayed on the head-up display. For example, if five graphical elements, to be displayed on separate depth planes, each comprising a different context and information to be displayed to the user, exist but the head-up display only permits four planes to be viewed at a time, one plane will not be displayed. However, when navigating, a subset (e.g., four) of the total planes (e.g., five) is displayed to the user, upon interaction with the user input device, a second subset is displayed to the user. Accordingly, in some examples, the method further comprises receiving a second user interface navigation signal. The second user interface navigation signal selects a second subset of the plurality of graphical elements to be displayed on the head-up display.

In some examples, the head-up display is a holographic display. In some examples, the head-up display device is installed in a vehicle. For example, graphical images dynamically registered, and dynamically updated, upon a windscreen of a subject vehicle representing essential vehicle information. In some examples, the head-up display device is a user-wearable device.

In some examples, the user input device is a stepped control device, wherein each step corresponds to a movement in depth of the head-up display. For example, the user input device may be a manual controller supported on a center console or on a steering wheel and is configured to change information data on a head-up display in response to a manual input from a user, causing rotation of the input device past stepped control detents generates a signal for the head-up display. In some examples, the user input device is one of a wheel, a physical button, a switch, a touchpad, a direct-drive motor, or a trigger.

In some examples, the user input device comprises software-controllable detents, wherein each detent corresponds to a movement in depth of the head-up display. For example, the user input device may be a manual controller supported on a center console or on a steering wheel and is configured to change information data on a head-up display in response to a manual input from a user, causing rotation of the input device past software-controllable detents generates a signal for the head-up display.

In some examples, the user input device comprises a controllable haptic actuator, wherein each haptic pulse corresponds to navigating in depth of the head-up display. For example, a haptic actuator may be incorporated for creating selective resistance to rotation of the user input device about the scroll axis. The haptic actuator can take any of the known forms and be structured according to any of the known techniques for providing haptic feedback effects to the user input device.

Accordingly, and in some examples, the method further comprises providing haptic feedback in response to the received user interface navigation signal between each plane of the head-up display. In some examples, the haptic feedback is provided by at least one of vibration, force feedback, air vortex rings, or ultrasound. The majority of vibration-based haptics use a type of eccentric rotating mass actuator, consisting of an unbalanced weight attached to a motor shaft. Force feedback devices typically use motors to manipulate the movement of an item held by the user. Air vortex rings are commonly donut-shaped air pockets made up of concentrated gusts of air. Focused ultrasound beams are often used to create a localized sense of pressure on a finger without touching any physical object.

In some examples, each graphical element, or group of elements, of the display has a different context. For example, the head-up display can utilize information inputs from a plurality of sensors and data modules to monitor, vehicle operation, vehicle operational environment, infotainment systems, and/or navigation systems; each of these inputs can be represented by a graphical element and therefore each element can have a different context.

In some examples, the method further comprises calculating (i.e., determining) a priority score of a graphical element, or group of graphical elements, based on a current action of the user. For example, the priority score determining may be further based on; actively extracting input from the user, interpreting the user's intention, resolving the ambiguity between competing interpretations, requesting and receiving clarifying information if necessary, and performing (i.e., initiating) actions based on distinguished intent. Further, determining the priority score may be carried out, or assisted by, the use of an intelligent automated assistant, configured to carry out any or all of the aforementioned actions. In addition, in some examples, the method further comprises ordering each graphical element, or group of graphical elements, according to the determined priority scores. In some examples, the method further comprises arranging each graphical element (or group of graphical elements) of the display at a perceived depth based on a monotonic scale of the priority scores.

In some examples, the method further comprises retrieving, from a storage device, a haptic feedback profile of the user. In some examples, the method further comprises displaying, based on the context of the first plane, a haptic feedback control user interface. In addition, the method further comprises updating the feedback profile of the user based on a selection from the control user interface and the context of the first plane. In some examples, the feedback profile comprises a user preference of at least one of an intensity parameter, a density parameter, or a sharpness parameter. In some examples, the method further comprises adjusting at least one of; an intensity parameter, a density parameter, or a sharpness parameter. For example, the user may adjust the intensity of a haptic feedback actuator within the user input device to be less intense. In response to the user adjusting such a parameter, this information can be used to update the user feedback profile.

In some examples, the stepped user input device comprises a stepped control device, wherein each detent corresponds to moving in depth of the head-up display.

In some examples, the stepped user input device comprises software-controllable detents, wherein each detent corresponds to moving in depth of the head-up display.

In some examples, the user input device further comprises a controllable haptic actuator, wherein each haptic pulse corresponds to navigating in depth of the head-up display.

In some examples, the controllable haptic actuator is configured to provide at least one of: vibration, force feedback, air vortex rings, or ultrasound.

In some examples, the stepped user input device is one of: a scroll wheel, a physical button, a switch, a touchpad, a direct-drive motor, or a trigger.

In some examples, the head-up display is configured for a vehicle, or configured to be installed in a vehicle. In some examples, the head-up display is configured for a user-wearable device, or configured to be installed in a user-wearable device. In some examples, the head-up display is replaced by a non-mobile or fixed display device, or configured to be installed in a fixed display device, a fixed display device is a display device that is alternative to anything mobile or wearable. For example, it may be integrated within the dash or console of a vehicle (e.g., installed in the vehicle in permanent or semi-permanent manner), however it is not necessarily limited to a vehicular display. The disclosure herein is compatible with a number of different sorts of displays, and does not require to be in a head-up configuration, in addition, for example, the display does not have to be "see-through".

In another approach, there is provided a non-transitory computer-readable medium, having instructions recorded thereon for controlling a head-up display. When executed, the instructions cause a method to be carried out, the method (and therefore instructions) comprise generating, on a head-up display device, a head-up display including a plurality of graphical elements, each graphical element being generated at one of a range of depths on the head-up display; displaying an indication that one of the graphical elements is currently selected; receiving a user interface navigation signal, from a user input device, to rotate the selection through the graphical elements in order of depth in response to user actuation of a navigation control; and performing an action associated with the currently selected graphical element in response to user actuation of the user input device.

In another approach, there is provided a device for providing a user interface, comprising a control module and a transceiver module configured to generate, on a head-up display device, a head-up display including a plurality of graphical elements, each graphical element being generated at one of a range of depths on the head-up display; display an indication that one of the graphical elements is currently selected; receive a user interface navigation signal, from a user input device, to rotate the selection through the graphical elements in order of depth in response to user actuation of a navigation control; and perform an action associated with the currently selected graphical element in response to user actuation of the user input device.

In another approach there is provided a system for controlling a head-up display, the system comprising: means for generating, on a head-up display device, a head-up display including a plurality of graphical elements, each graphical element being generated at one of a range of depths on the head-up display; means for displaying an indication that one of the graphical elements is currently selected; means for receiving a user interface navigation signal, from a user input device, to rotate the selection through the graphical elements in order of depth in response to user actuation of a navigation control; and means for performing an action associated with the currently selected graphical element in response to user actuation of the user input device.

In another approach there is provided an apparatus for providing a user interface, the apparatus comprising a display device arranged to display an image including a plurality of graphical elements displayed at different apparent depths to the user, the image including a visual indication that one of the graphical elements is currently selected; a receiver for receiving a user interface navigation signal from a user interface navigation control; a display controller arranged in operation to update the image to move the visual indication to graphical elements at an adjacent apparent depth in response to the receipt of the user interface navigation signal; a receiver for receiving an activation signal from an activation control; and a transmitter arranged in operation to respond to the activation signal by transmitting a control command which depends upon which graphical element is currently selected.

In another approach there is provided a user interface for an apparatus, the interface comprising: a head-up display in which different planes are displayed at different apparent depths to a user; a stepped user input device, to receive an input from the user; wherein the head-up display is arranged to highlight a currently selected depth plane; and wherein the stepped user input device is in communication with the head-up display and arranged to step through the depth planes as the user moves the input device through the steps.

In another approach a method of providing a user interface, the method comprising: generating, on a display device, a display including a plurality of graphical elements, each graphical element being displayed at one of a plurality of perceived depths on the display; displaying an indication that one of the perceived depths is currently selected; receiving a user interface navigation signal, from a user input device, to progress the selection through the perceived depths in order of depth in response to user actuation of a navigation control; and performing an action associated with the currently selected depth plane in response to user actuation of an activation control of the user input device. For example, the display may be a 3D augmented reality display, or a multiplanar 3D display. For example, the present disclosure would equally apply to devices comprising multiplanar displays, such as 3D displays on a smartwatch or the like.

Accordingly, there is presented herein methods, systems, and apparatus for controlling a display (e.g., a multiplanar display, 3D AR display, or head-up display) and, more particularly, to systems and related processes for interaction mechanisms between a user input device and said display.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

FIGS. 1-4 are illustrative diagrams showing exemplary head-up displays and navigation mechanisms of the same, in accordance with some embodiments of the disclosure. Referring to FIGS. 1-4 advancing the user input device, e.g, clicking a scroll wheel, rotates the highlight/choice of a plane from one depth plane/graphical element/group of graphical elements to the next. This and other illustrations are meant to be understood as perspective views where the items shown in sequence are on successively deeper planes. Each of the graphical elements can be generated for display by a head-up display device at different focal points and/or a group of the graphical elements may be generated for display at the same focal point, In addition, the graphical elements may be generated for display at a different size and/or position on a head-up display, relative to a user's perspective.

Figure 1:
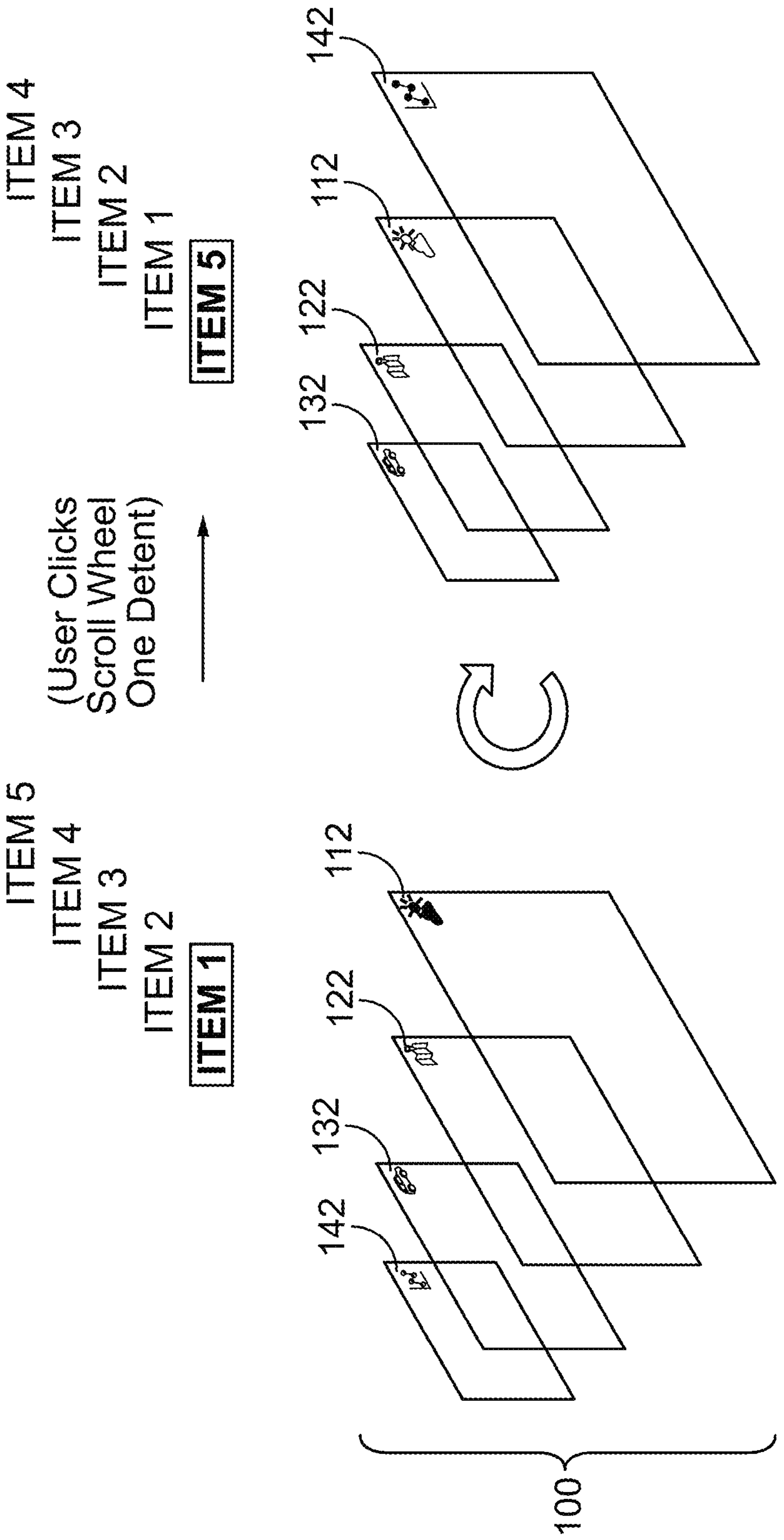
FIGS. 1-4 are illustrative diagrams showing exemplary head-up displays and navigation mechanisms of the same, in accordance with some embodiments of the disclosure.

In more detail, FIG. 1 depicts a plurality of graphical elements 100, which may be referred to as each being generated on a series of depth planes, or planes, each graphical element or plane 112-142 having a different context. For example, a weather information plane 112, a navigation information plane 122, a vehicle information plane 132, and a system information plane 142. FIG. 1 is an exemplary depiction of a navigation modality of the present disclosure. In particular, as the user interacts with the user input device 110, the rearmost plane, in this case, the system information plane 142 is brought to the foremost plane, and all other planes move back one position, relative to a perceived depth from a user's perspective. In this exemplary case, the number of planes is equal to or less than the number of possible viewable planes; therefore the rearmost plane is always brought to the foremost viewable position or vice versa.

In the embodiment of FIG. 1, the user may be able to see the plurality of graphical elements 100, however, each subsequent plane is "greyed out" relative to the last. Such that the user can see how far away the desired plane is, but not so much that the rearmost planes are obstructive to the user's view, as described in more detail with regard to FIGS. 18 and 19.

Figure 2:
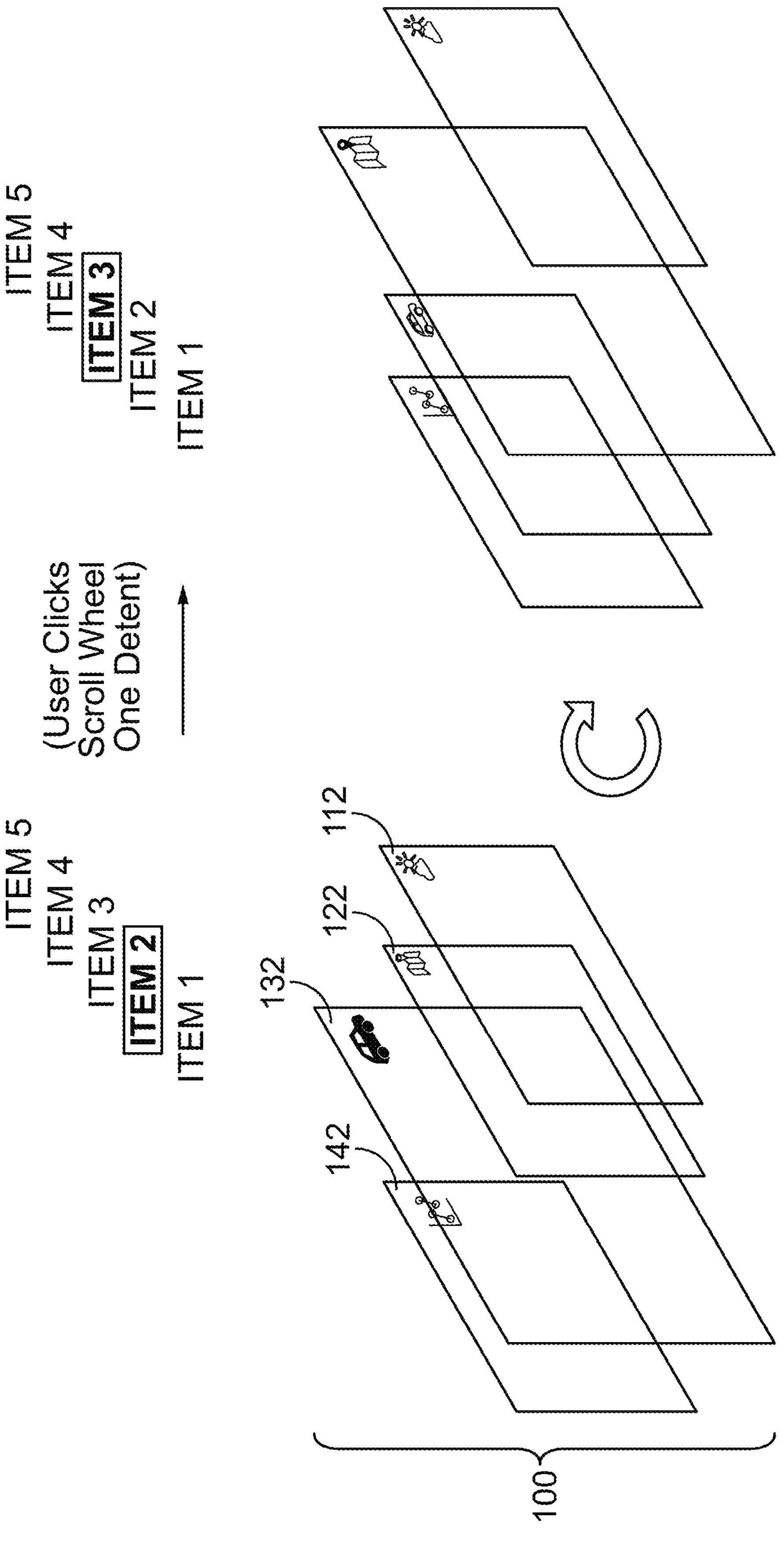

With regard to FIG. 2, a predetermined plane is referred to as a selection plane 200 and clicking the scroll wheel rotates the selectable items through the graphical elements, and the user observes the plane in the selection plane 200. The selection plane 200 may be the required position for a user to interact with a plane. In some examples, the user cannot see any other plane other than the selection plane 200 or, alternatively, the user enters a "selection plane view" after interacting with the user input device 110.

As shown in FIG. 2, the user is observing the navigation plane 122, after interacting with the user input device 110, the user observes the vehicle information plane 132. In this way, the selecting plane 200 can be described as moving from plane 122 to plane 132, or that the planes have rotated through the selection plane, both examples are intended to be within the present disclosure. In some examples, the user may observe a plane indicator for each window, such as the icon in each of planes 112-142.

Figure 3:
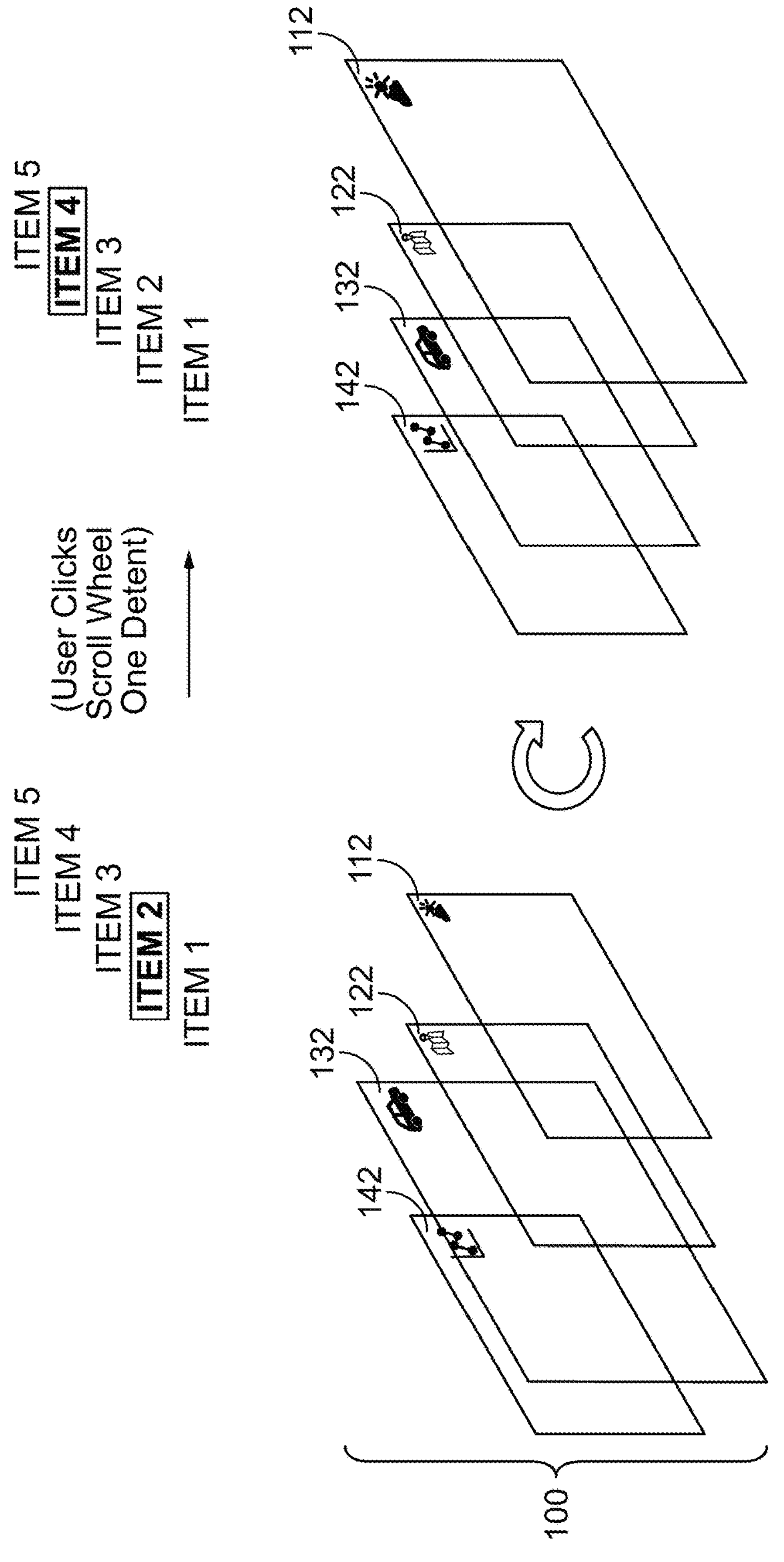

With regard to FIG. 3, when in a selection plane view, such that the user is attempting to interact with a graphical element, a predetermined plane is the selection plane 200 and interacting with the user input device advances a subset of a long list of selectable items that is displayed. If a particular plane is not active, not able to be interacted with, or not appropriate at a particular time, interacting with the user input device may skip a plane. For example, as shown in FIG. 3, the selection plane 200 is currently on vehicle information plane 132, after interaction with the user input device 110, the selection plane 200 advances to weather information plane 112 because the navigation plane 122 is not currently available (e.g., because the user currently does not have a navigation route input to a vehicle's navigation session). Accordingly, the selection plane 200 has gone directly to the depth plane of the next active item. The inactive or unselectable items may be visually labeled as such by, for example being "grayed out" as is intended to be shown in FIG. 3, crossing them out, or some other visual indicator. In some examples, the haptic feedback control of the user input device is altered such that the user has to move further past the inactive plane.

Figure 4:
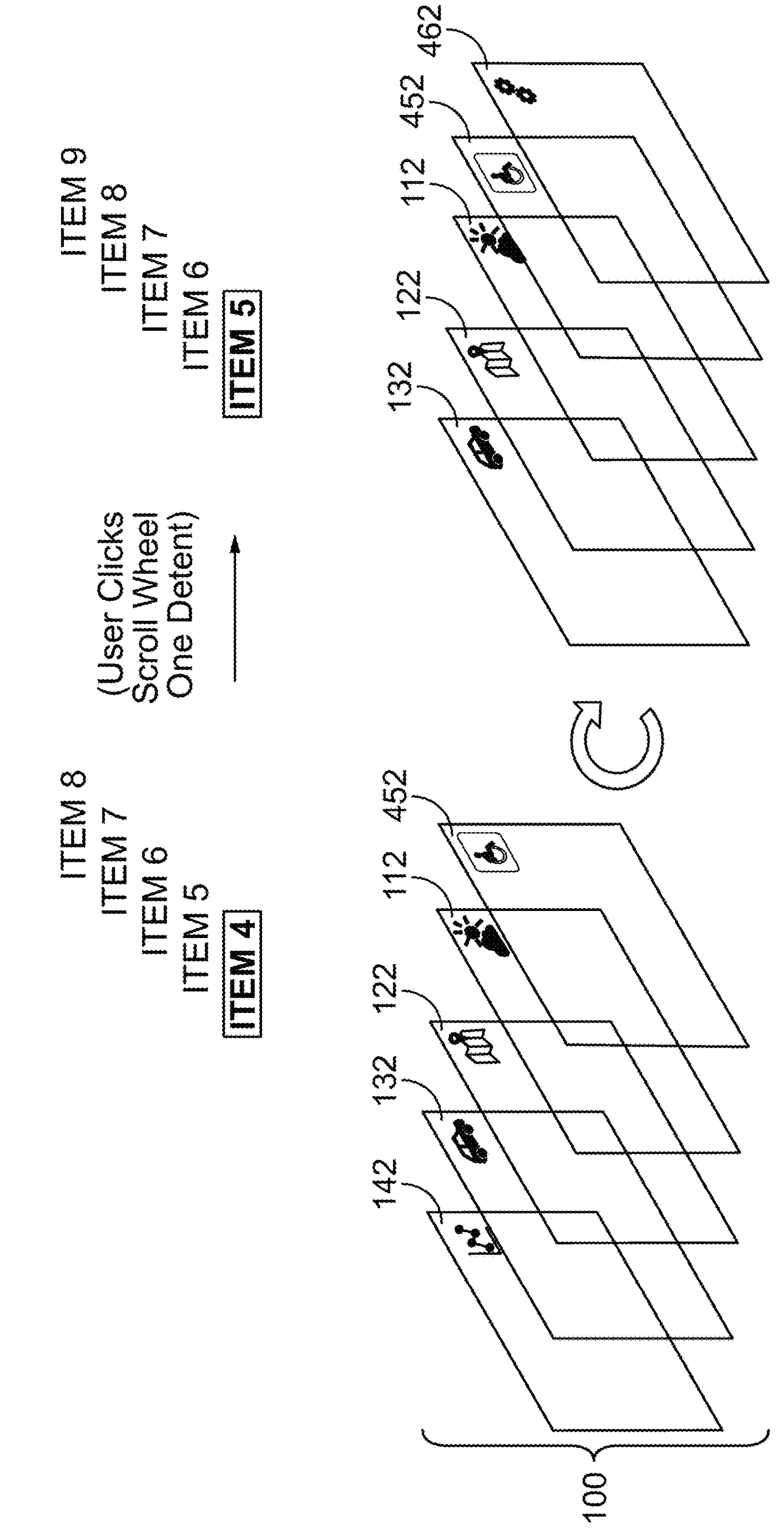

FIG. 4 illustrates a first subset of a plurality of graphical elements 410 of a larger group of a plurality of graphical elements. In some examples, the number of graphical element may be greater than the number of graphical elements that can be viewed on the head-up display. For example, if seven graphical elements exist but the head-up display only permits five planes to be viewed at a time, two planes are not displayed. However, when navigating, a subset (e.g., five) of the total planes (e.g., seven) is displayed to the user, upon interaction with the user input device, a second subset is displayed to the user.

By way of example, referring to FIG. 4, the user is currently viewing a first subset 400 of a plurality of graphical elements comprised in planes 112, 122, 132, 142, and 452, wherein plane 452 is an accessibility plane. After interaction with the user input device 110, a second subset 410 of the plurality of graphical elements is selected and viewable by the user. In this example, the second subset 410 comprises planes 112, 122, 132, 452, and a settings plane 462. In the second subset, system plane 142 is not being displayed, whereas in the first subset the settings plane 462 was not being displayed.

Figure 5:
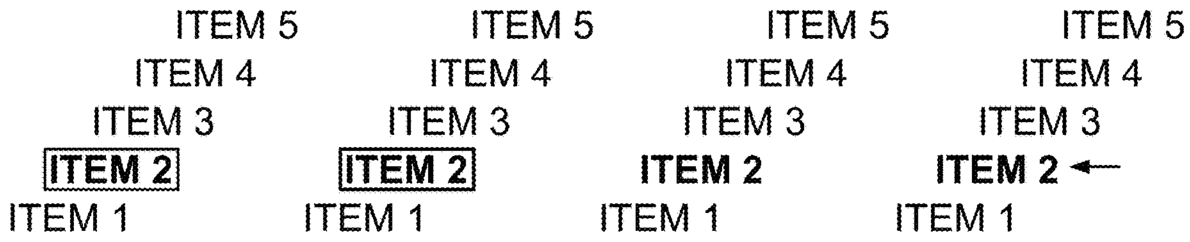
FIGS. 5 and 6 are exemplary navigation mechanisms of a head-up display, in accordance with some embodiments of the disclosure.
Figure 6:
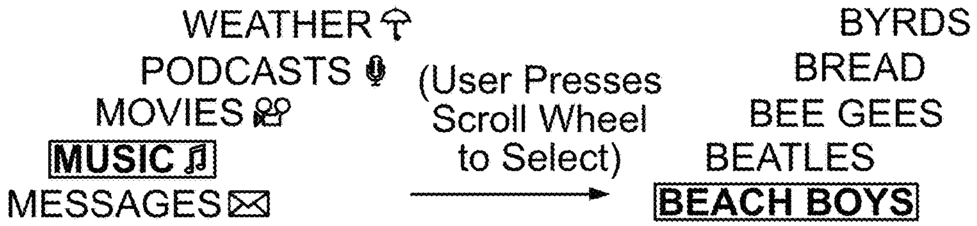

FIGS. 5 and 6 are exemplary navigation and highlighting mechanisms of a head-up display, in accordance with some embodiments of the disclosure. FIG. 5 illustrates a plurality of non-limiting ways that the head-up display system may highlight any particular item or plane of the plurality of graphical elements or information thereon. For example, an item may be circled/perimetered with a shape, negatively contrasted, the font amended to be bigger or bolder, or an indicator may be used to explicitly indicate an item of choice. In addition, other possible ways of highlighting the selectable item include outlining, reversing, magnifying, moving a cursor to that depth plane. In some examples, a combination of one or more of the previous methods of highlighting the item or plane is used. It should be noted, however, that a depth plane must comprise a graphical element to be perceived in the first instance. That is to say that generating a display including a plurality of depth planes would not be visible until one or more of the depth planes comprise graphical elements. One or more of the graphical elements can be displayed at one of a plurality of perceived depths on the display. An indication that one of the perceived depths is currently selected can be displayed and, as the user interacts with the device, progress the selection through the perceived depths in order of depth in response to user actuation of a navigation control. Thereafter, any actions associated with the currently selected depth plane can be performed.

With regard to FIG. 6, when interacting with a particular plane, a menu or submenu of selectable items may be displayed to the user. For example, after navigating to a music plane, a nested submenu is displayed with a list of artists for the user to select from. In this way, it is shown that selecting a plane in the selection plane 200, may bring up a set of selectable options within that category, as referred to with regard to FIG. 2.

Figure 7:
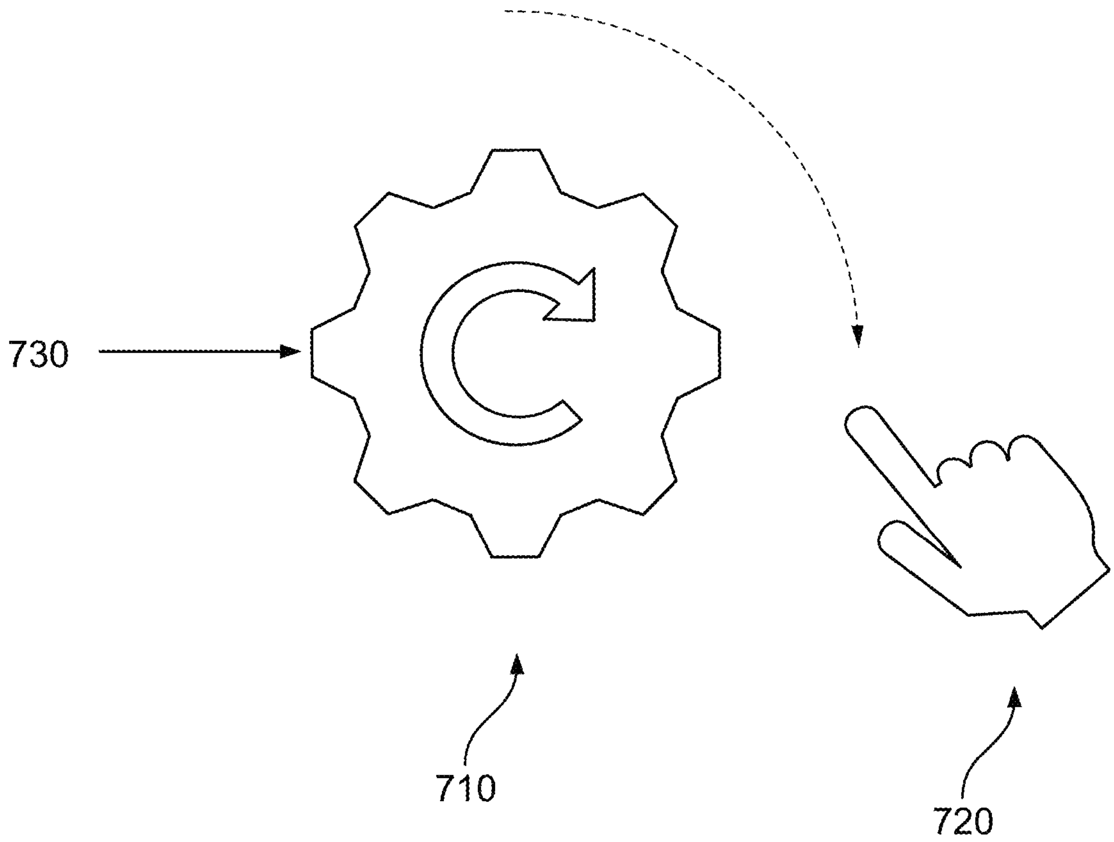
FIG. 7 depicts an exemplary user input device, in accordance with some embodiments of the disclosure.

In any combination of the aforementioned navigation, selection or highlighting action, it is intended that a user interacts with a user input device 110. FIG. 7 depicts an exemplary user input device 710, in accordance with some embodiments of the disclosure. The user input device 710 of FIG. 7 is a particular implementation of a user input device, but it is intended that a plurality of input devices may replace or substitute for a user input device 710. For example, it will be appreciated that examples discussed herein need not be limited to traditional scroll wheels, an electromechanical device that provides a similar haptic/tactile experience, as will be described in more detail below, such as a thin or flat sensor/actuator incorporated into a bracelet, watchband, or ring that is paired (either electronically, mechanically, or via communication methods as described with reference to FIG. 24) to the user input device, may also be used. In some examples, the user input device is a stepped device. Meaning that the user input device has either mechanically-fixed detents, that the user clicks through, or that the user input device has software-controllable detents that the user clicks through. The clicks referred to herein may be, in the case of the stepped control input device, induced by the movement of the input device 710 or by a haptic actuator. As the user interacts with a user input device 710, the user may be able to interact with graphical elements at different focal points and/or a group of graphical elements at the same focal point; relative to the user's perspective.

A haptic actuator (not shown) can be particularly effective in assisting a user 720 to navigate the various planes of a multiplanar head-up display, with minimal distraction to the task or action they are currently undertaking if any. For example, in the case of driving, a user 720 can interact with an input device on a center console or on a steering wheel, navigate through the menus and planes of the head-up display, all without taking their eyes off the road. The haptic actuator is controllable to various resistive sequences that can be applied to the user input device 710, when interacted with by a user 720, to help the user 720 intuitive navigate through the plurality of graphical elements on the head-up display. A software-based user input device, with software-controllable detents, gives the impression of mechanical attributes common in typical control wheels on/in various devices.

Through repetitive use of the head-up display and user input device, a user will come to associate a given haptic feedback pattern with a particular selection, so that navigation through the various screens and presentations can be accomplished entirely through touch and feel. The haptic actuator located within the user input device can be further associated with an audible system, which provides sounds, such as chimes, music, or recorded messages, as the various selections and screens are navigated through the user input device 710.

By way of example, FIG. 7 depicts with outer spokes a series of detents 730 which will be felt by the user as the user input device 710 is rotated by the user 720 in either direction. As mentioned above, the detents can be mechanically-fixed or programmed into the user input device. A haptic actuator can be programmed to correspond precisely to the available selections presented on the head-up display. Referring back to the example of FIG. 4, six selections are possible, a controllable feature incorporated into the haptic actuator could arrange a pattern of detents 730, like those shown in FIG. 7, to correspond in number and relative depth position to each of the planes presented on the head-up display. These detents 730 would thus be synchronized with any highlight or selection modality of FIGS. 1 to 6, as will be described in more detail regarding FIGS. 9 and 12-16.

Figure 8:
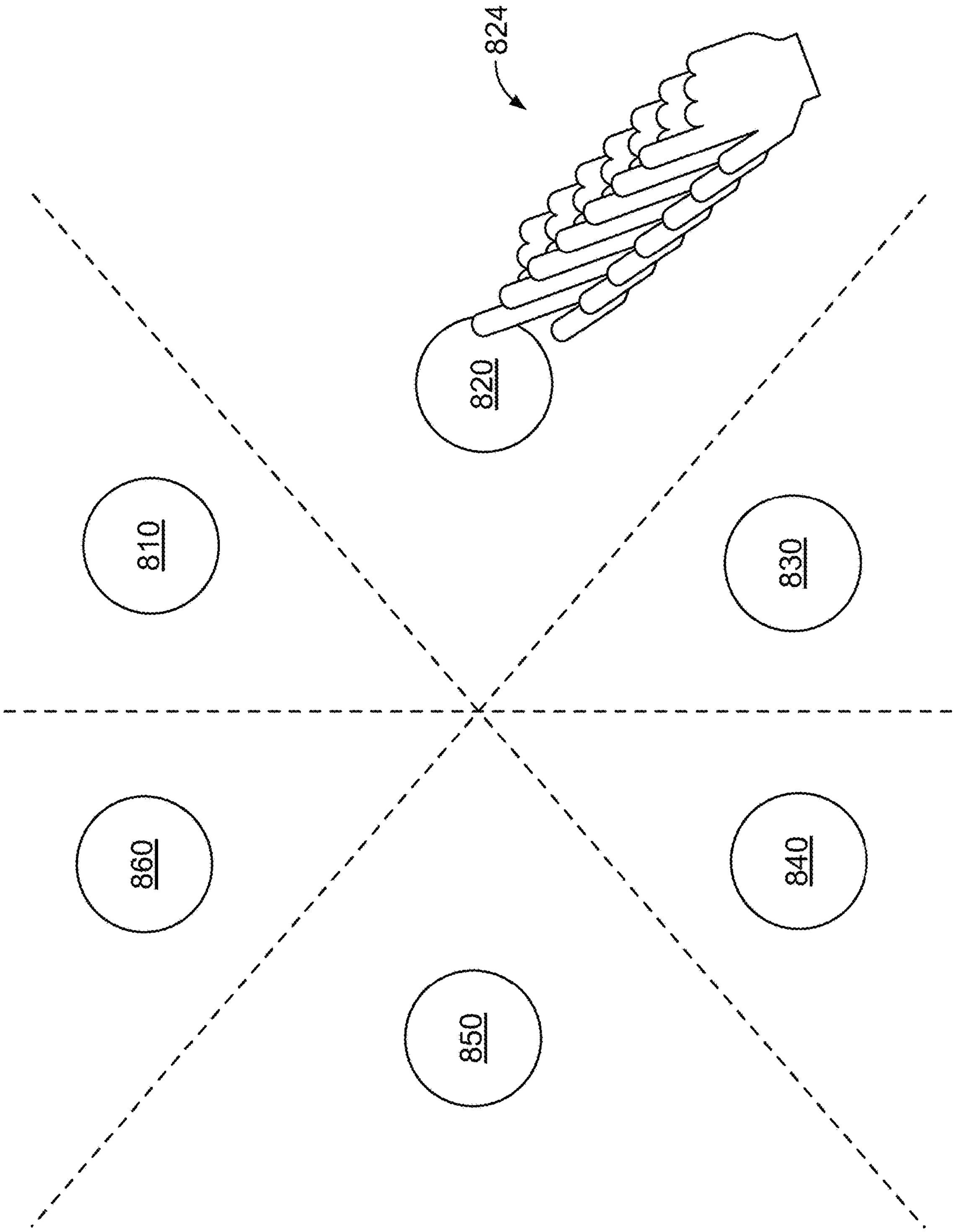
FIG. 8 depicts a further exemplary user input device, in accordance with some embodiments of the disclosure.

FIG. 8 depicts a further exemplary user input device centered on user haptic input and feedback, in accordance with some embodiments of the disclosure. In some examples, the user input device may comprise a touchpad, that the user interacts with by providing haptic input 824. For example, user haptic input 824 is a combination of taps and drags (e.g., paths are drawn by the user's finger) the system can interpret for navigation through the plurality of graphical elements, as will be described in more detail with reference to FIGS. 9-16. However, with regard to this particular type of user input (i.e., haptic), an accumulation of the haptic inputs of the user in number (e.g., 5 inputs, 3 taps and 2 drags) are recorded and used to determine how the user wishes to navigate the graphical elements.

FIG. 8 further shows different zones 810-860. The zones 810-860 may each have a different input control configuration. For example, zone 820 may cause advances through the graphical elements, and zone 850 may cause retreats back through the graphical elements. Other zones, such as 810 and 830, 840, and 860 are optionally not present and or are configurable zones to access menus, submenus, select items on the current plane, and the like. In addition, user inputs may include "taps" and "double taps," and the dragging of the user's finger across the touchpad to control a cursor, for example.

Figure 9:
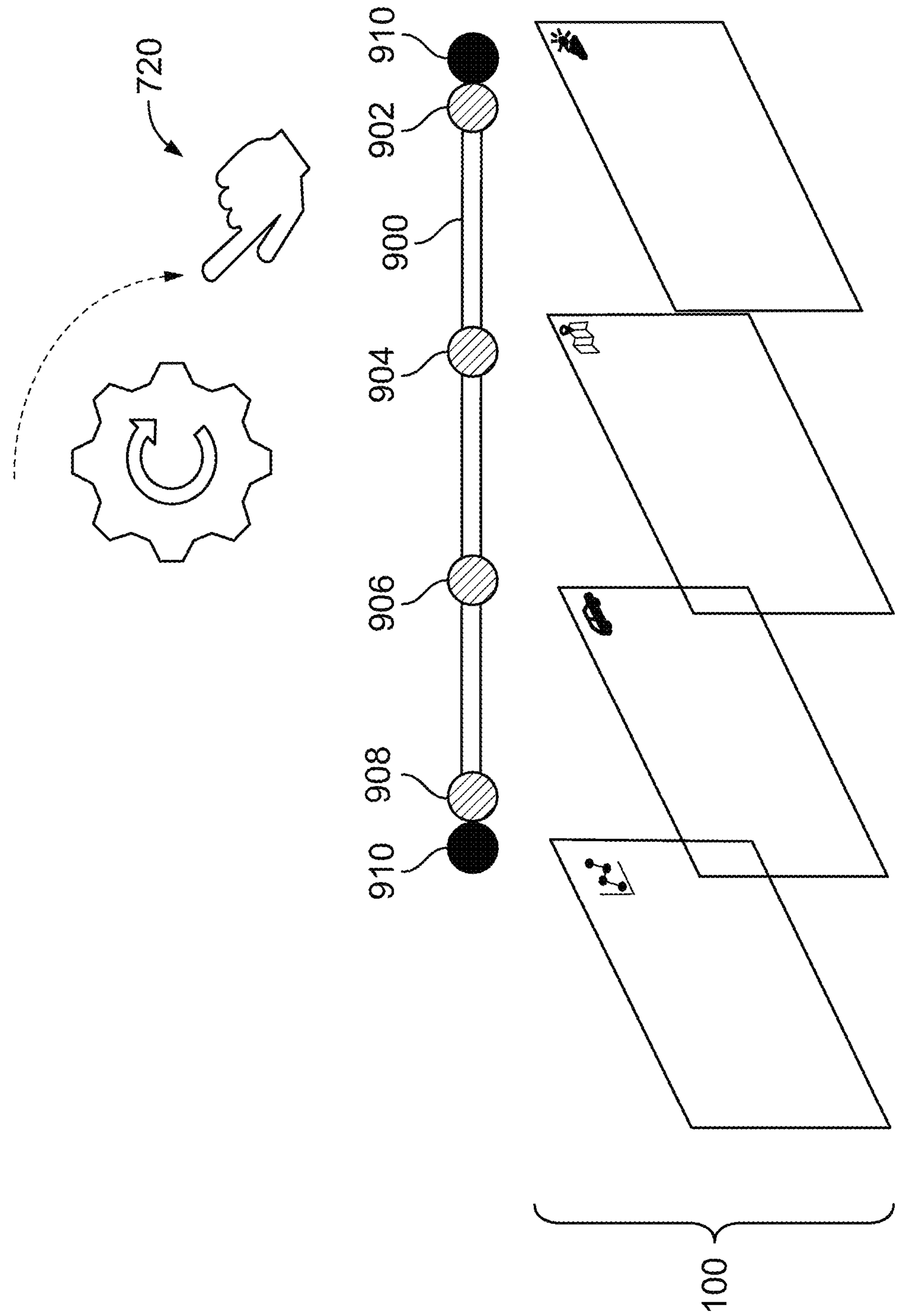
FIG. 9 depicts an exemplary user input device and navigation between a plurality of graphical elements of a head-up display, in accordance with some embodiments of the disclosure.

FIG. 9 depicts an exemplary user input device and navigation between a plurality of graphical elements of a head-up display, in accordance with some embodiments of the disclosure. As described above, a haptic actuator can be programmed to correspond precisely to the available selections presented on the head-up display. The detents would thus be synchronized with any highlight or selection modality of FIGS. 1 to 6. Accordingly, when a plane with a different context is displayed on the head-up display, the haptic actuator can employ a different haptic feedback profile that is intuitively adapted to the current context of the primary plane of the plurality of graphical elements on the head-up display.

For example, FIG. 9 illustrates a user input device 710, which is being operated by a user 720. The user input device rotations map onto a scroll bar 900. The scroll bar 900 is a graphical representation of the depth distance between each plane of the plurality of graphical elements 100 in the head-up display. Each of the markers 902-908 represent a "click" or detent on the scroll wheel 710 and a particular plane of the plurality of graphical elements 100, as shown. Put another way, the detents, or markers 902-908, are resistive points on the scroll wheel 710. Other resistive points are of course possible. For example, FIG. 9 illustrates stops 910 that are imposed upon the rotation of the user input device 710, either mechanically or software-based. The stops 910 are arranged to correspond with each end of the scroll bar 900 in FIG. 9. Thus, as the user's virtual position on the scroll bar 900, the user input device 710 will stop rotating at each stop 910, which corresponds with the user's virtual position reaching either end of the scroll bar 900. In this way, the user can use their tactile senses to interact with the head-up display control system and inputs without detracting their attention from a current action(s).

In some examples, the haptic feedback profile can be stored in storage. Each user of the device comprising the head-up display, can configure their own haptic feedback preferences and store that in a user profile. In this way, a user of the head-up display, for example, a driver, can see upon glancing at the foremost plane of the head-up display, or even by memory, that movement from a first plane to a second plane is two "clicks" away in the clockwise direction, the user input device can be rotated, without looking, through two clicks of the felt detents (either software-controlled or mechanically-fixed detent) thus allowing the driver to confidently operate, select, and interface with the head-up display and know that their selection has been made without the need to take their eyes from the road.

Figure 10:
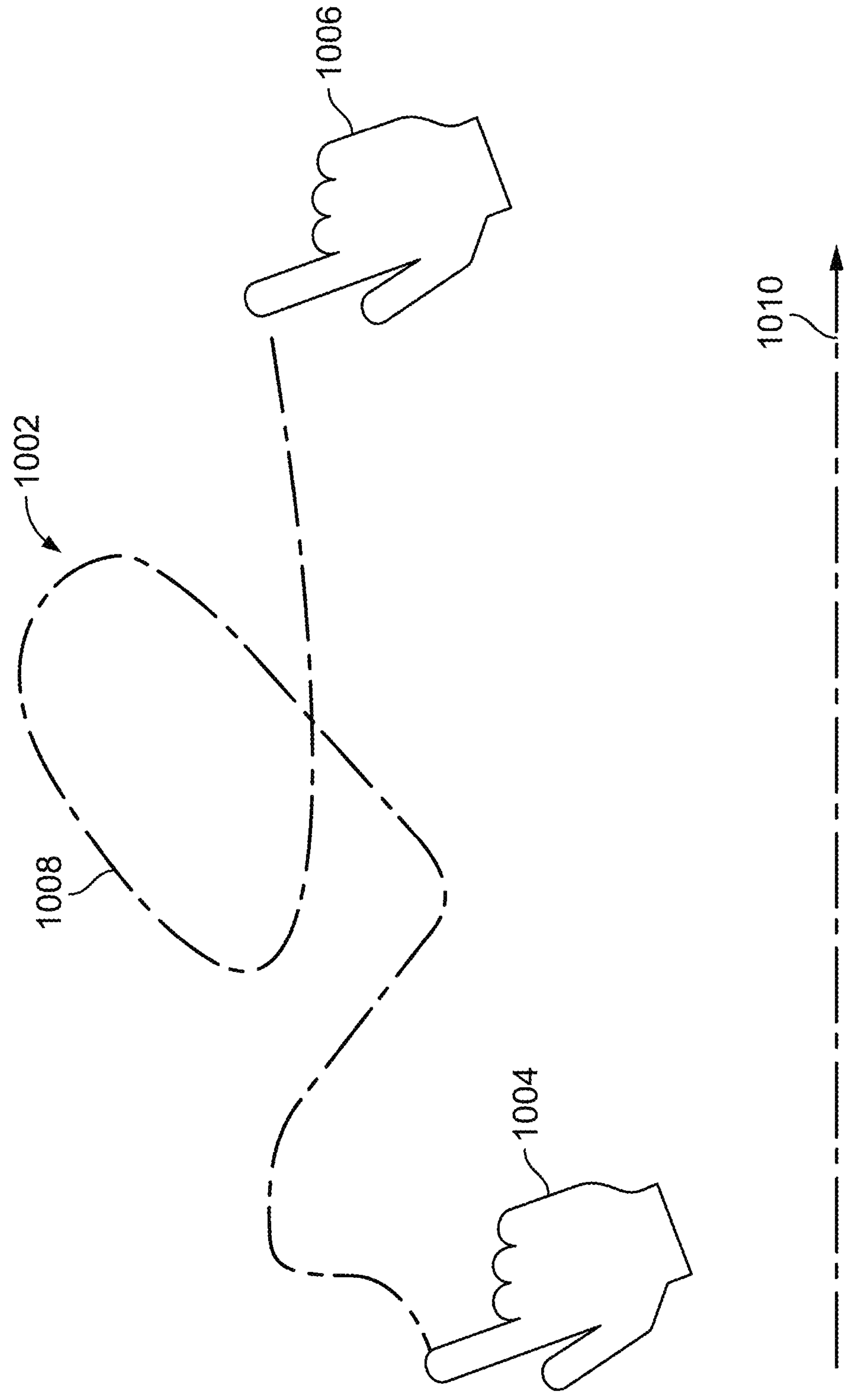
FIG. 10 illustrates the translation between a user input on a user input device and an input signal, in accordance with some embodiments of the disclosure.

FIG. 10 illustrates the translation between a user input on a user input device and an input signal, in accordance with some embodiments of the disclosure. The amount of navigation through the graphical elements may comprise a path drawn by the user on a user input device configured to receive such input. For instance, in FIG. 10, a path 1002 starts with the detection of a physical input 1004 from the user on a user input device, such as a touchpad, and terminates with the detection of a release 1006 on the user input device. The path may be essentially 1-dimensional, although, practically speaking. a user is not likely to draw a perfectly straight line, therefore the path will inherently be 2-dimensional, as illustrated in FIG. 10.

To convert the path drawn by the user's input into a navigation amount that can be used to navigate throughout the plurality of graphical elements 100 a length of the path may be computed. In one example, the navigation amount is the overall length of the path. When the path is a 2-dimensional path, a 2-dimensional grid may be used to compute the length of the path. Using a 2-dimensional path, the length of the path may include at least one loop 1008 to increase its length (e.g., a finger going 3 cm to the right then 1 cm to the left means the path has a length of 4 cm). Therefore, the user might not need to use a whole dimension of the touchpad to input the navigation amount, but can easily do it on a small, localized portion of the user input device. In one example, the navigation interval is the length of the path going in one direction, such as left and right (e.g., a finger going 3 cm to the right then 1 cm to the left means the path has a length of 2 cm to the right and not a length of 4 cm). This allows movement forward (i.e., advancing through the graphical elements) and backward (i.e., reverse back through the graphical elements) based on the direction of the path. In this case, the loop would have a null effect (or close to null) on the length of the path. In one embodiment, the navigation interval is the length of a 1-dimensional projection 1010 of the 2-dimensional path (e.g., a projection orthogonal to the scroll bar 900 or parallel with the scroll bar 900). In one example, the navigation interval is the length of the projection of the path based on the direction of the path, such as left and right (e.g., a projection, of a path, going 3 cm to the right then 1 cm to the left means the projection of the path has a length of 2 cm to the right).

In some examples, loop 1008 may indicate that the user wishes to select a more precise navigation interval or enter a submenu (e.g., a selection). Put another way, loop 1008 activates a slower scrubbing speed when navigating, for example, a submenu, allowing the user to make a more granular selection of their intended navigation interval. In some examples, the substantially linear sections of the path correlate the distance of the path with one scaling parameter and the substantially circular (e.g., loop 1008) sections of the path correlate the distance of the path with a second scaling parameter.

Figure 11:
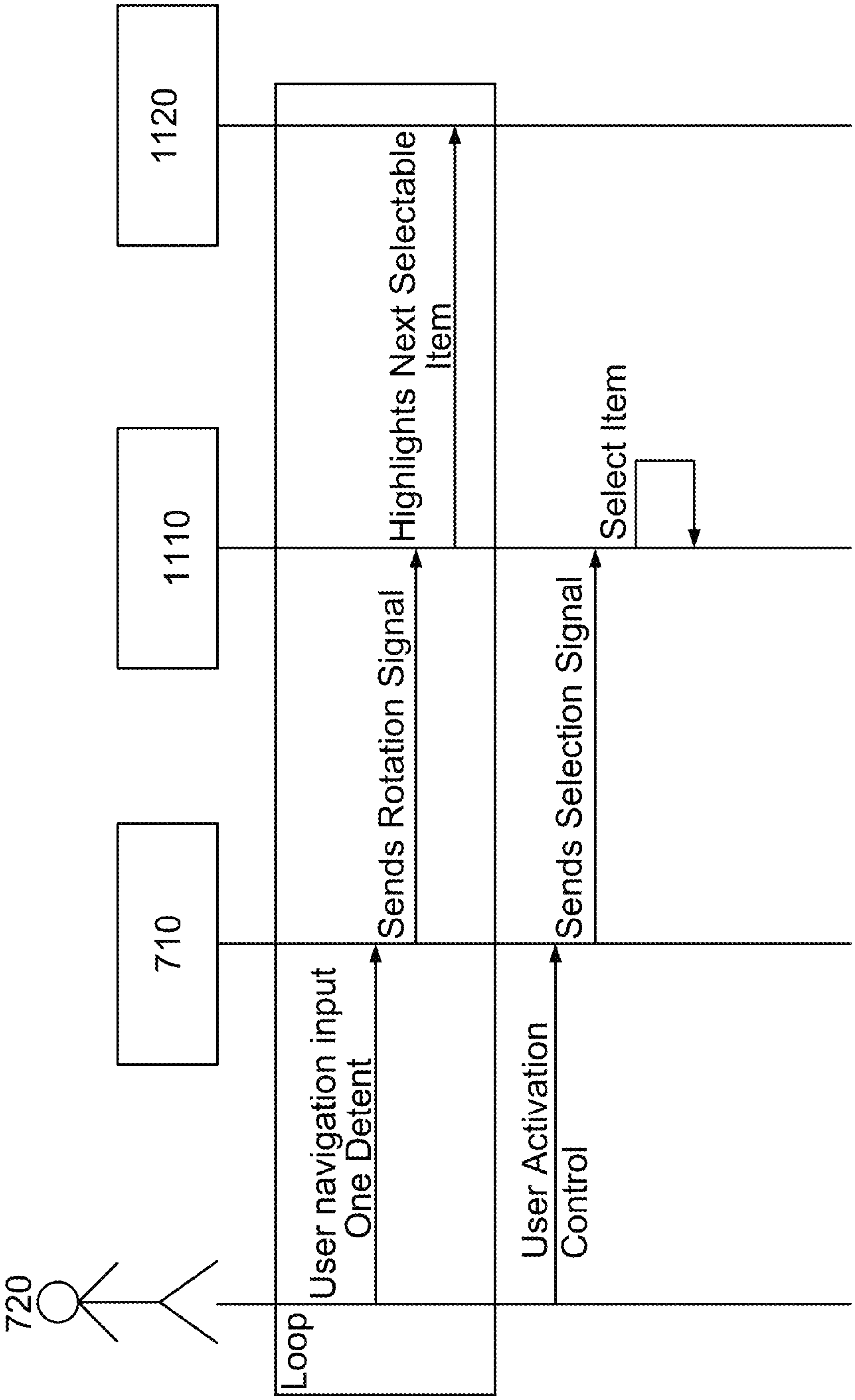
FIG. 11 illustrates a control mechanism between a user input on a user input device, an input signal to a system controller, and an output on a display, in accordance with some embodiments of the disclosure.

FIG. 11 illustrates a control mechanism between a user input on a user input device, an input signal to a system controller, and an output on a display, in accordance with some embodiments of the disclosure. As shown in FIG. 11, a user 720 interacts with a user input device, such as a scroll wheel by one detent. The scroll wheel 710 generates a signal that is sent to a controller, which causes to be generated on the head-up display a highlight for the next selectable item, or rotates the graphical elements through to a selectable plane 200, as discussed with reference to FIG. 2. The user 720 may also perform a select action on the head-up display, for example by pressing in a scroll wheel 710. After pressing the scroll wheel 710, the scroll wheel 710 generates a signal that is sent to a controller, which selects the item or plane of choice.

FIGS. 12-15 illustrate exemplary control modalities of a head-up display, in accordance with some embodiments of the disclosure. By way of example, FIGS. 12-15 illustrate different control bars 900 of the head-up display system and how each of the markers 902-908 and stops 910 can be utilized. As described with reference to FIG. 9. the detents, or markers 902-908, are resistive points on the scroll wheel 710.

Figure 12:
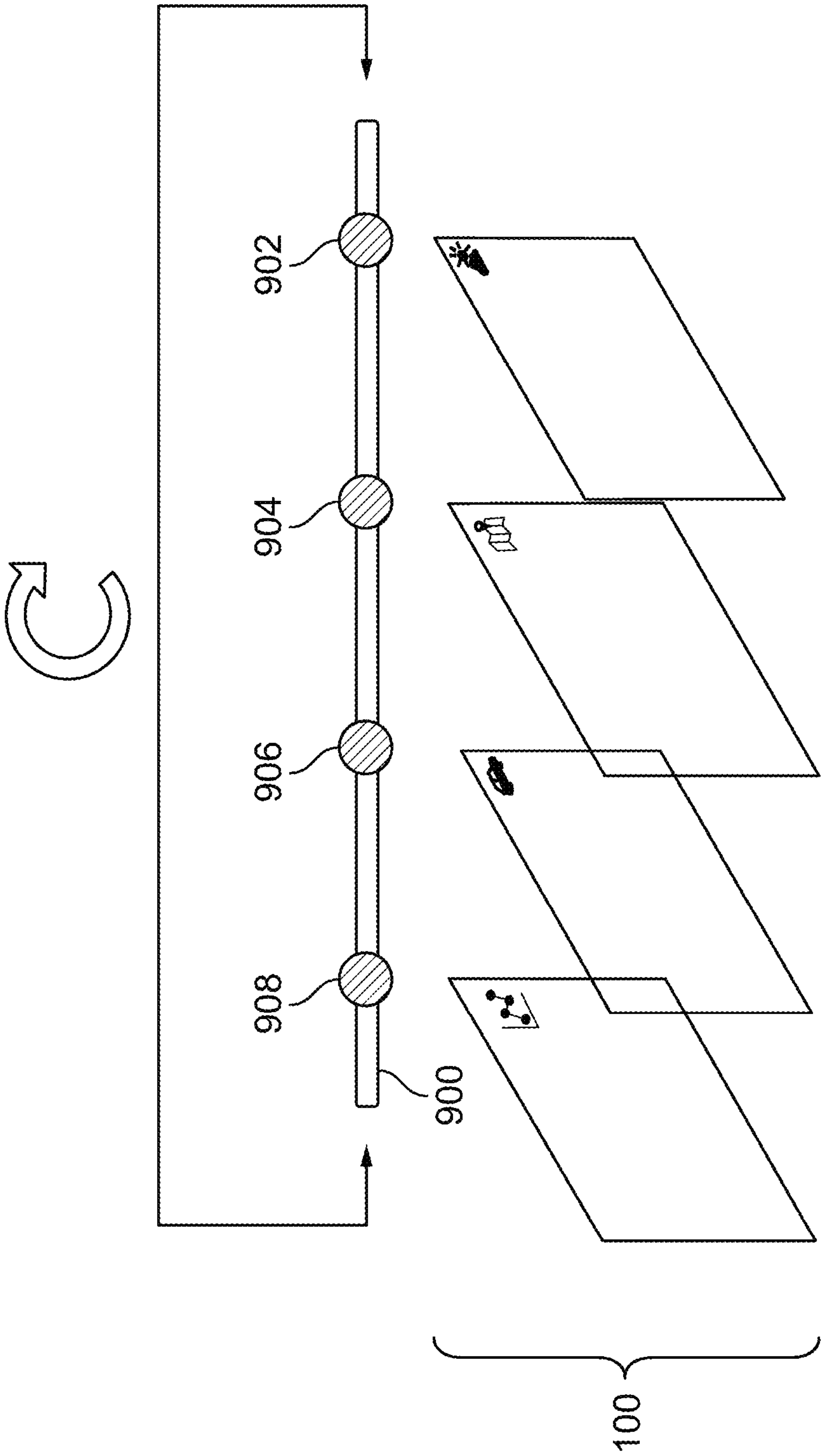
FIGS. 12-15 illustrate exemplary control modalities of a head-up display, in accordance with some embodiments of the disclosure.

With reference to FIG. 12, there are no stops 910. Instead, as the user cycles through the plurality of graphical elements 100, passing the markers 902-908, the user's virtual position circles back to the front of the control bar 900. For example, as the user progresses through from the first plane marker 902 to the lattermost plane marker 908 the virtual position of the user circles back around to the first marker 902. In some examples, this also happens in the reverse direction.

Figure 13:
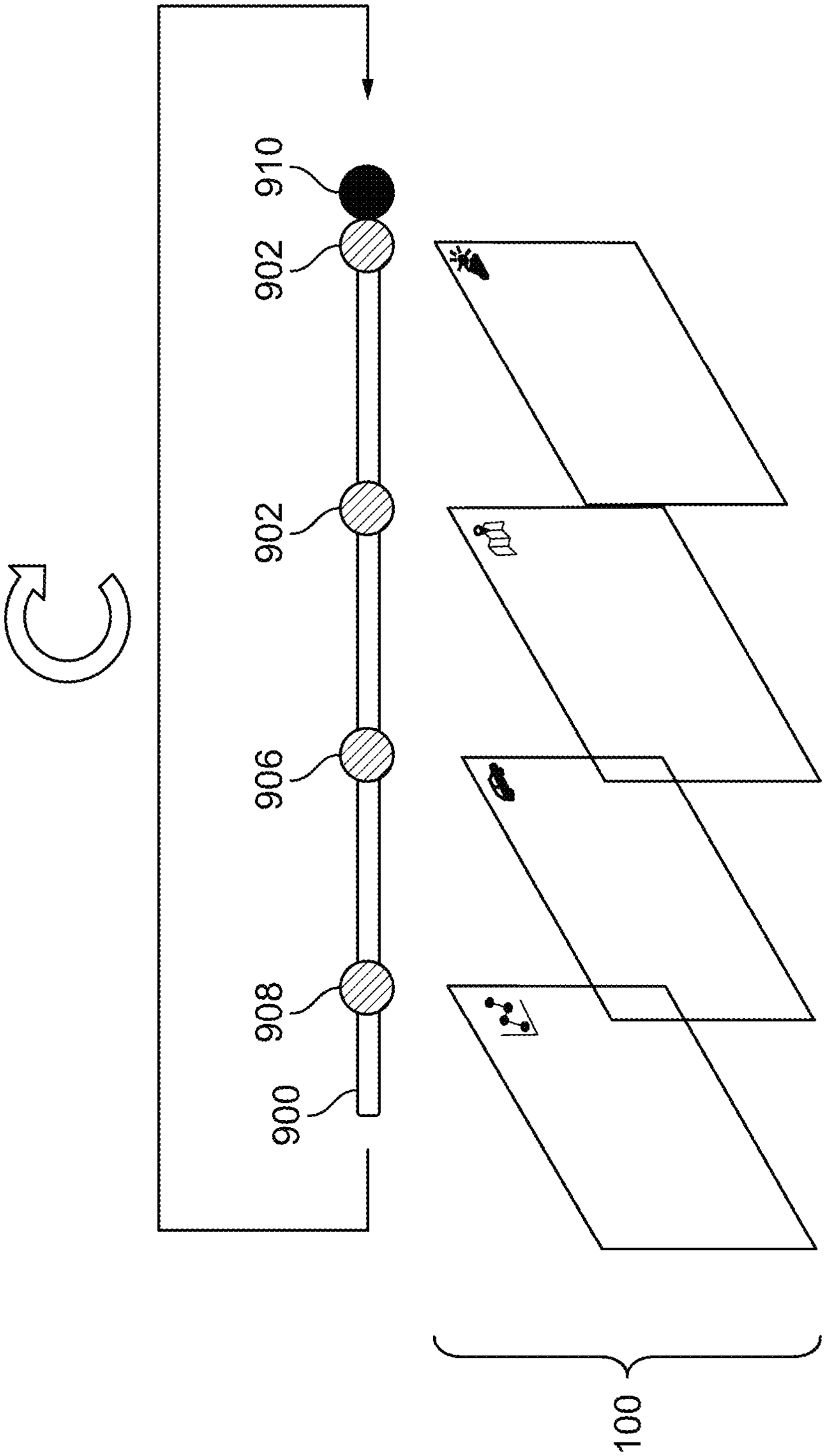

With reference to FIG. 13, there is one stop 910. In this regard, as the user cycles through the plurality of graphical elements 100, passing the markers 902-908, the user's virtual position does circles back to the front of the control bar 900. For example, as the user progresses through from the first plane marker 902 to the lattermost plane marker 908 the virtual position of the user circles back around to the first marker 902. However, in going in the reverse direction, as the user cycles through the markers 908-902, the stop 910 at marker 902 prevents the user from circling back around to the lattermost plane marker 908. As described previously, stop 910 at the marker 902 has a different haptic feedback profile than the markers 902-908, therefore the user can tell, without looking and based on haptic feedback alone, that they are at the so-called, "start" of the head-up display plurality of graphical elements.

Figure 14:
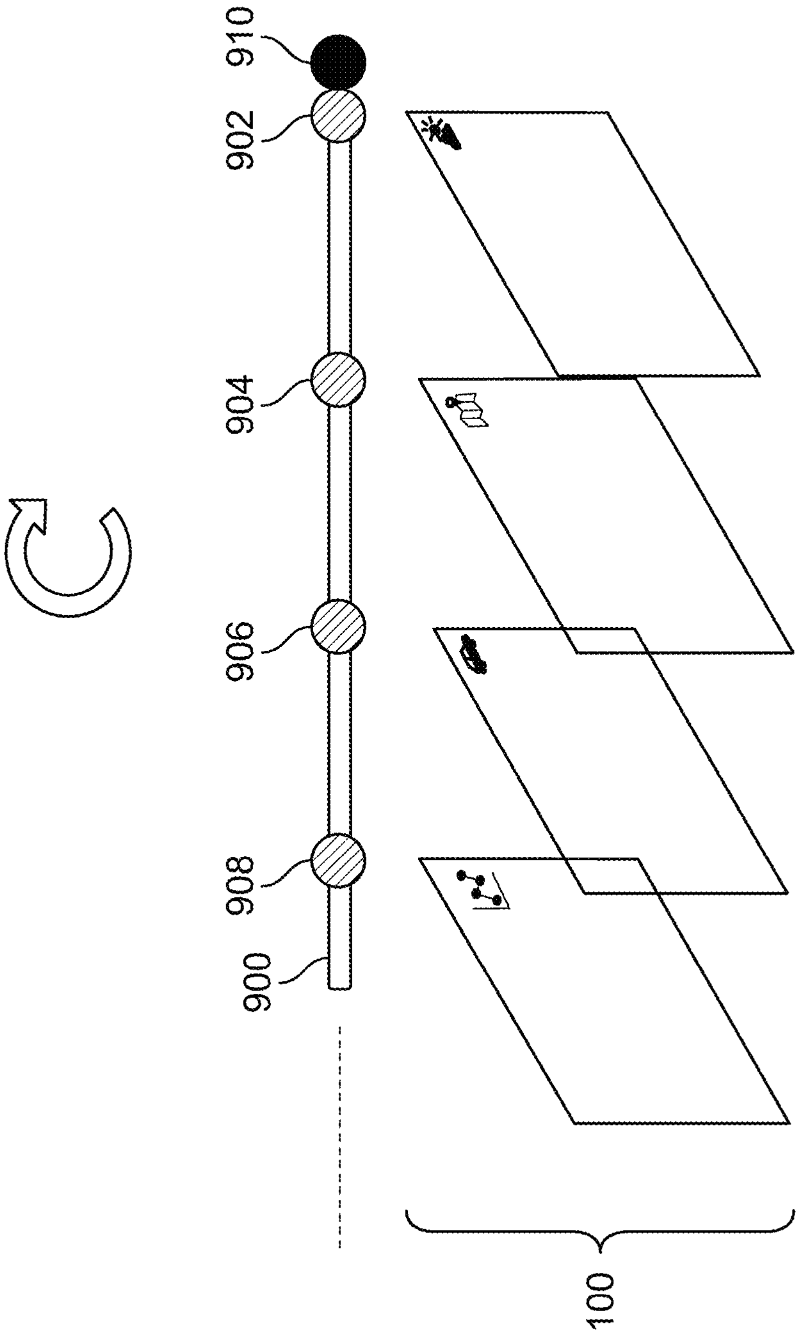

With reference to FIG. 14, there is one stop 910. going in the reverse direction, as the user cycles through the markers 908-902, the stop 910 at marker 902 prevents the user from circling back around to the lattermost plane marker 908. As described previously, stop 910 at the marker 902 has a different haptic feedback profile than the markers 902-908, therefore the user can tell, without looking and based on haptic feedback alone, that they are at the so-called, "start" of the head-up display plurality of graphical elements. However, the feedback profile after the latter most plane marker 908, changes to inform the user that they have finished scrolling through the plurality of graphical elements 100. In some examples, the haptic feedback profile (e.g., the haptic configuration) after the lattermost marker 908 is selected such that the resistance, or feedback, from the user input device, disappears. In this regard, as the user cycles through the plurality of graphical elements 100, passing the markers 902-908, the user's virtual position feels as though it's "fallen off the cliff," that is to say that the resistance or "clicks" has gone away or stopped/For example, as the user progresses through from the first plane marker 902 to the lattermost plane marker 908 the virtual position of the user waits just beyond the lattermost marker 908.

Figure 15:
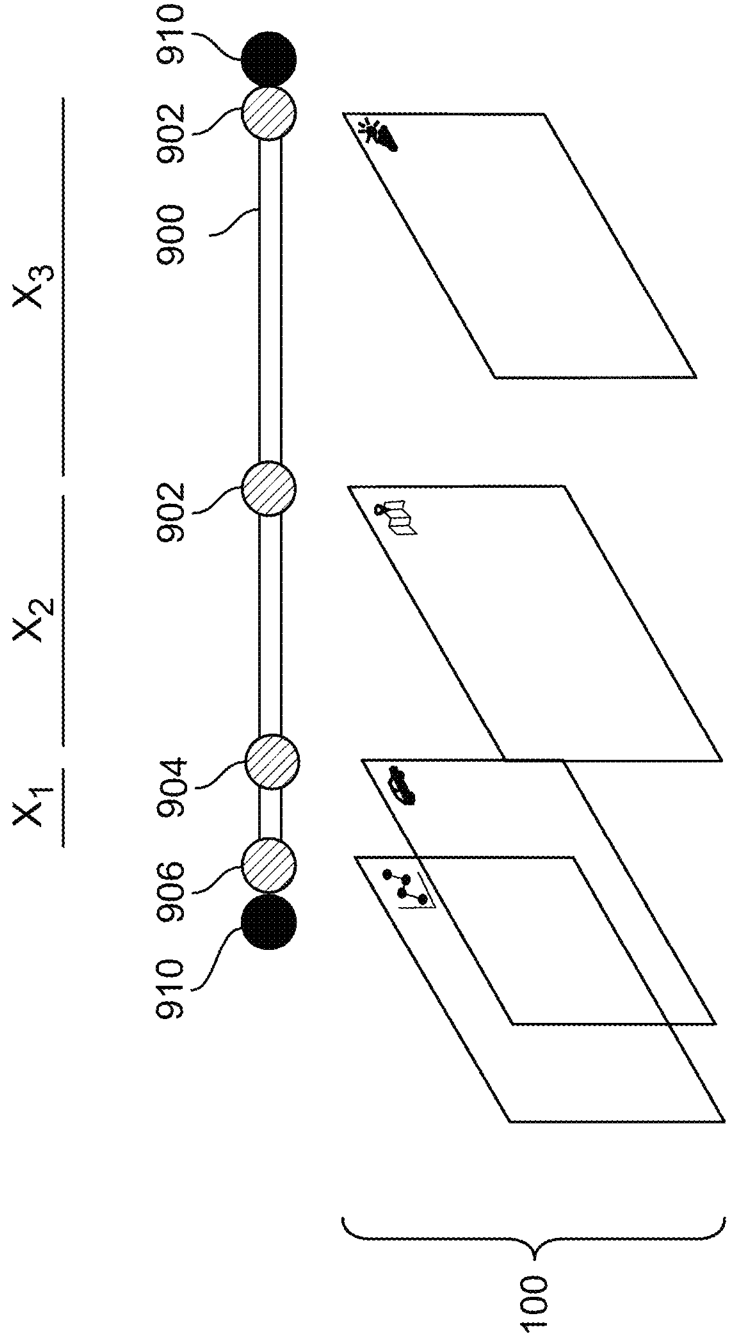

With regard to FIG. 15, in some examples, each plane of the display has a different context. For example, the head-up display can utilize information inputs from a plurality of sensors and data modules to monitor, for example, vehicle operation, vehicle operational environment, infotainment systems, and/or navigation systems. The user may currently be performing an action, that is related to the context of a plane of the display. Therefore, in some examples, each graphical element can be ranking based on an action of a user. After each graphical element is ranked (graphical elements display or not currently displayed) each graphical element can be arranged such based on the ranking at a perceived depth.

Likewise, in some examples, the method further comprises calculating (i.e., determining) a priority score of each plane of the display based on a current action of the user. In addition, in some examples, the method further comprises ordering each plane of the display according to the determined priority scores. In some examples, the method further comprises arranging each plane of the display at a perceived depth based on a monotonic scale of the priority scores. For example, the plane with the highest priority score is arranged closer to the user, as indicated by the closest marker 902 abutting stop 910. Moreover, the plane with the lowest priority score is arranged farthest from the user, as indicated by the rearmost marker 908 abutting stop 910. Further, as shown in FIG. 15 the distance between the markers 902 and 904, X3, is larger than the distance between markers 904 and 906, X2. This is because, in FIG. 15, the planes have been additionally arranged such that the distance between each plane is based on the relative priority score of each plane. The planes indicated by markers 906 and 908 have a similar priority score so are shown to have a short distance, X1, between them. In some examples, any one or more of the distances X1-X3 may be the same. In some examples, the distances are always different, to indicate to the user the calculated priority. In this way, the priority between each marker 902-908 is on a monotonic scale, i.e., a scale that always decreases, or remains the same. In this way, a clear order of priority of graphical elements can be established.

The examples given with reference to FIGS. 12-15 are considered compatible with any modality of navigation, selection, or highlighting of the plurality of graphical elements 100 described within.

Figure 16:
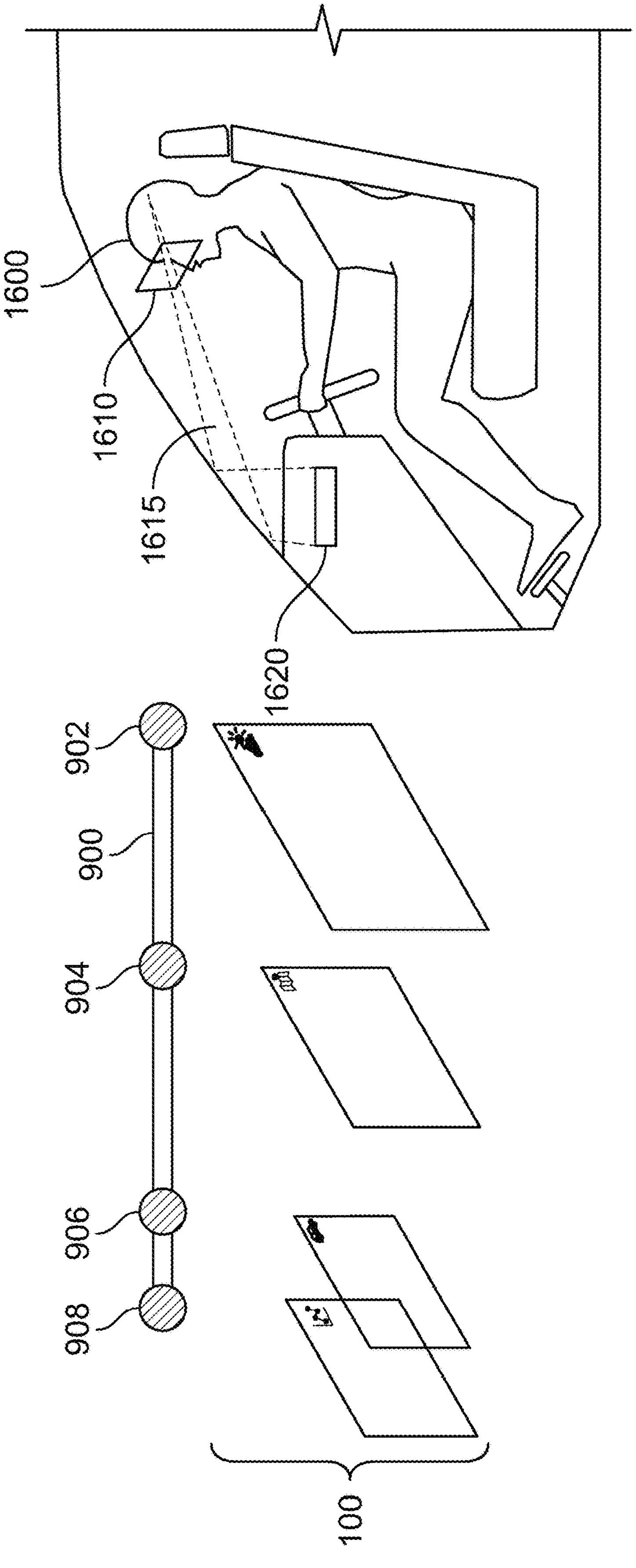
FIG. 16 depicts a head-up display of a vehicle, in accordance with some embodiments of the disclosure.

FIG. 16 depicts a head-up display of a vehicle, in accordance with some embodiments of the disclosure. Illustrated is a representative scroll bar 900, a plurality of graphical elements 100, and a vehicle 1600. Shown inside the vehicle is a user 720, operating the vehicle 1600, a view box 1610 of the user, a head-up display device 1620, and a lightbox 1625 of the head-up display device 1620. It should be noted that the view box 1610 and the lightbox 1625 are intended to represent the user's field of view and the path of light leaving the head-up display, respectively. The image of the plurality of graphical elements 100 is substantially transparent in the windscreen head-up display of vehicle 1600.

The vehicle 1600 includes a steering wheel and a central column, wherein the user input device 710 may be disposed. The vehicle may comprise an information system for the vehicle, which may operate in addition to, or in lieu of, other instruments and control features in the vehicle.

The vehicle may also comprise a computer for handling informational data, including vehicle data. The computer also includes other necessary electronic components known to those skilled in the art, such as a memory, a hard drive, communication interfaces, a power supply/converter, digital and analog converters, etc. The computer is connected to vehicle systems that provide the vehicle data which corresponds to the operation of the vehicle and associated vehicle systems. Examples of these vehicle systems, include, but are not limited to, an engine controller, a climate control system, an integrated cellular phone system, a sound system (radio), a global positioning system (GPS) receiver, and a video entertainment center (such as a DVD player). Examples of vehicle data provided by the vehicle systems include, but are not limited to, vehicle speed, engine RPM, engine oil pressure, engine coolant temperature, battery voltage, vehicle maintenance reminders, climate control system settings, outside temperature, radio settings, integrated cellular phone settings, compass headings, video images, sound files, digital radio broadcasts, state of charge of both high and low voltage batteries (e.g., 48V hybrid battery, 12V infotainment battery, etc.), and navigational information. All of the former information data, vehicle data, and vehicle systems may have a corresponding graphical element that may be represented on the head-up display.

The informational data handled by the computer can also include external data from a network external to the vehicle. In this case, an external wireless interface would be operatively connected to the computer to communicate with the network for sending and receiving external data. External data may include, but is not limited to, internet web pages, email, and navigational information.

Figure 17:
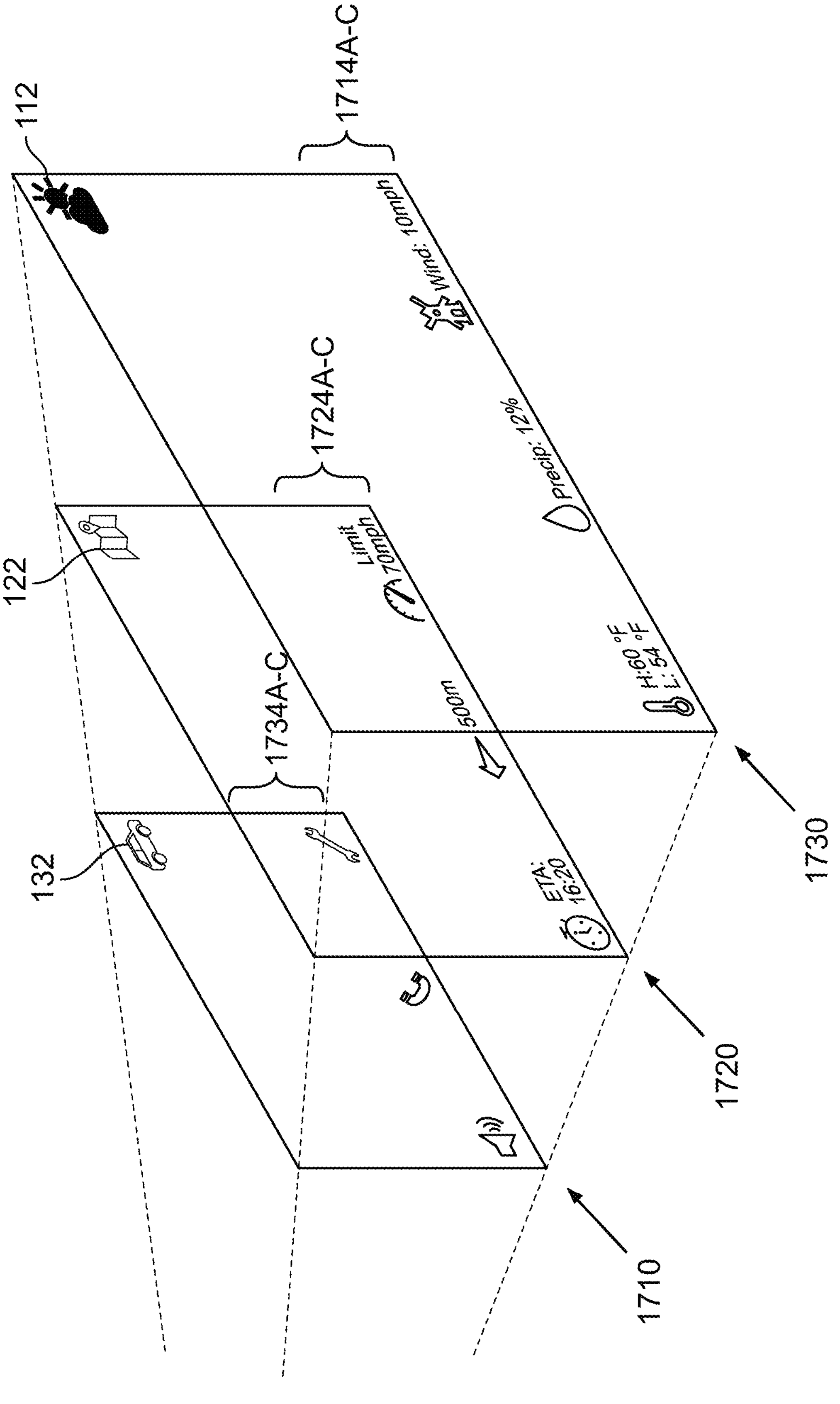
FIG. 17 illustrates exemplary planes of a head-up display, wherein each plane has a different context, in accordance with some embodiments of the disclosure.

The head-up display device 1625 emits light that enters the user's eye by reflecting off the windscreen of the vehicle 1600. This gives a holographic image in the windscreen that the user can see. The head-up display device is configured to provide a perceived depth of the plurality of graphical elements 100 from the user's 720 perspective. FIG. 17 illustrates exemplary planes of a head-up display that a user 720 might possibly observe in the vehicle 1600. Each of the planes 1710-1730 comprise a plurality of information data that is unique to the context of each plane.

For example, plane 1710 is a weather plane, as indicated by weather icon 112. The weather plane 1710 contains a plurality of displayable data 1714A-C comprising, for example, windscreen, precipitation, and temperature data. The second plane 1720 is a navigation plane, as indicated by the navigation icon 122. The navigation plane 1720 contains a plurality of displayable data 1724A-C comprises, for example, speed limit information, navigation instructions, and the estimated time of arrival. The third plane 1730 is a vehicle information plane, as indicated by vehicle information icon 132. The vehicle information plane 1730 contains a plurality of displayable data 1734A-C comprising, for example, a settings submenu, a communication submenu, and volume control. Accordingly, user 710 can quickly see at a glance a plurality of information relating to many vehicle systems. In some examples, the displayable data is only present on the foremost plane, and only the icons are displayable from the other planes, to prevent a cluttered head-up display and detracted from the user's action, for example driving.

Figure 18:
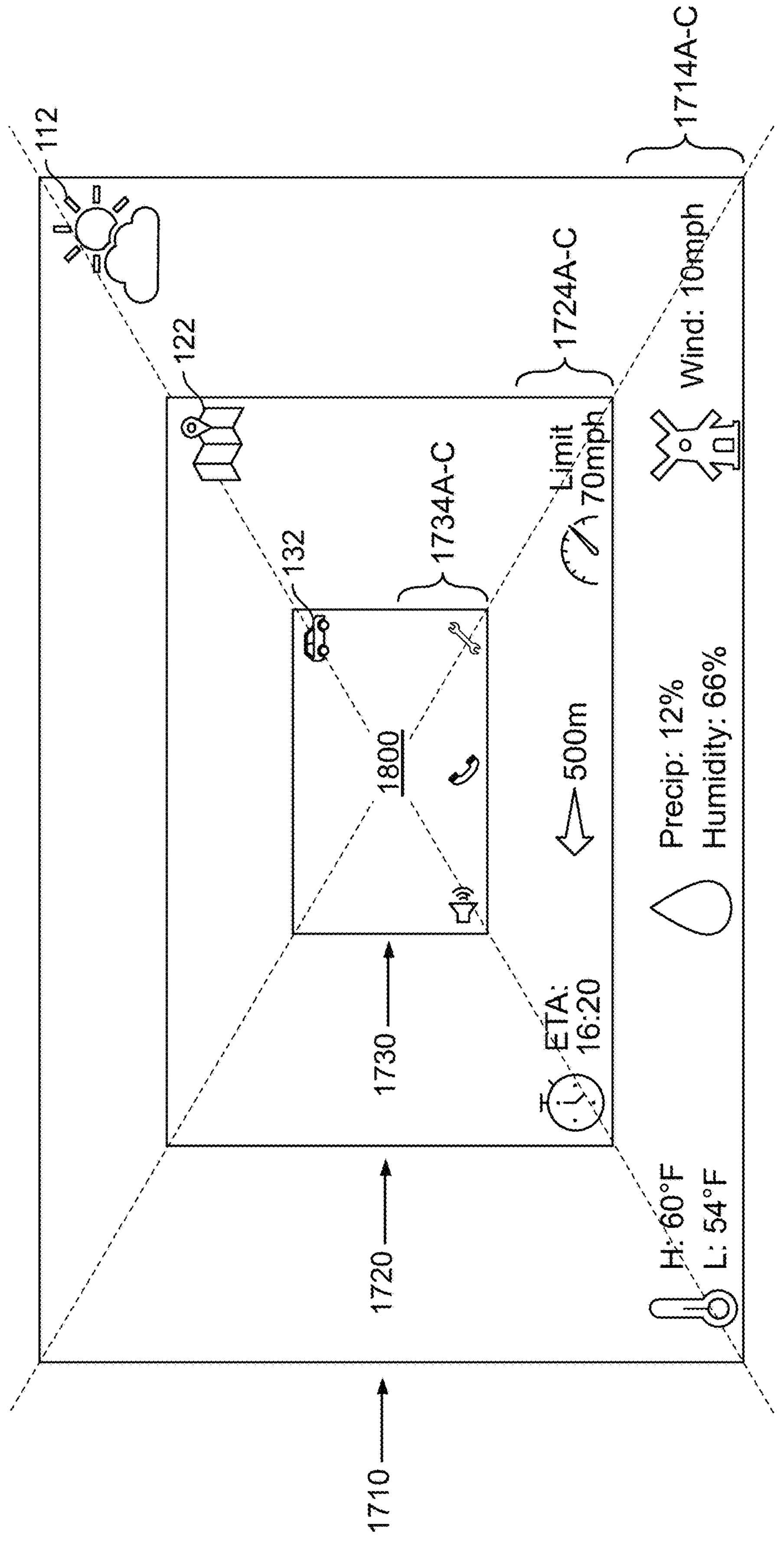
FIGS. 18 and 19 illustrate a concentric and non-concentric head-up display view from the perspective of a user, in accordance with some embodiments of the disclosure.
Figure 19:
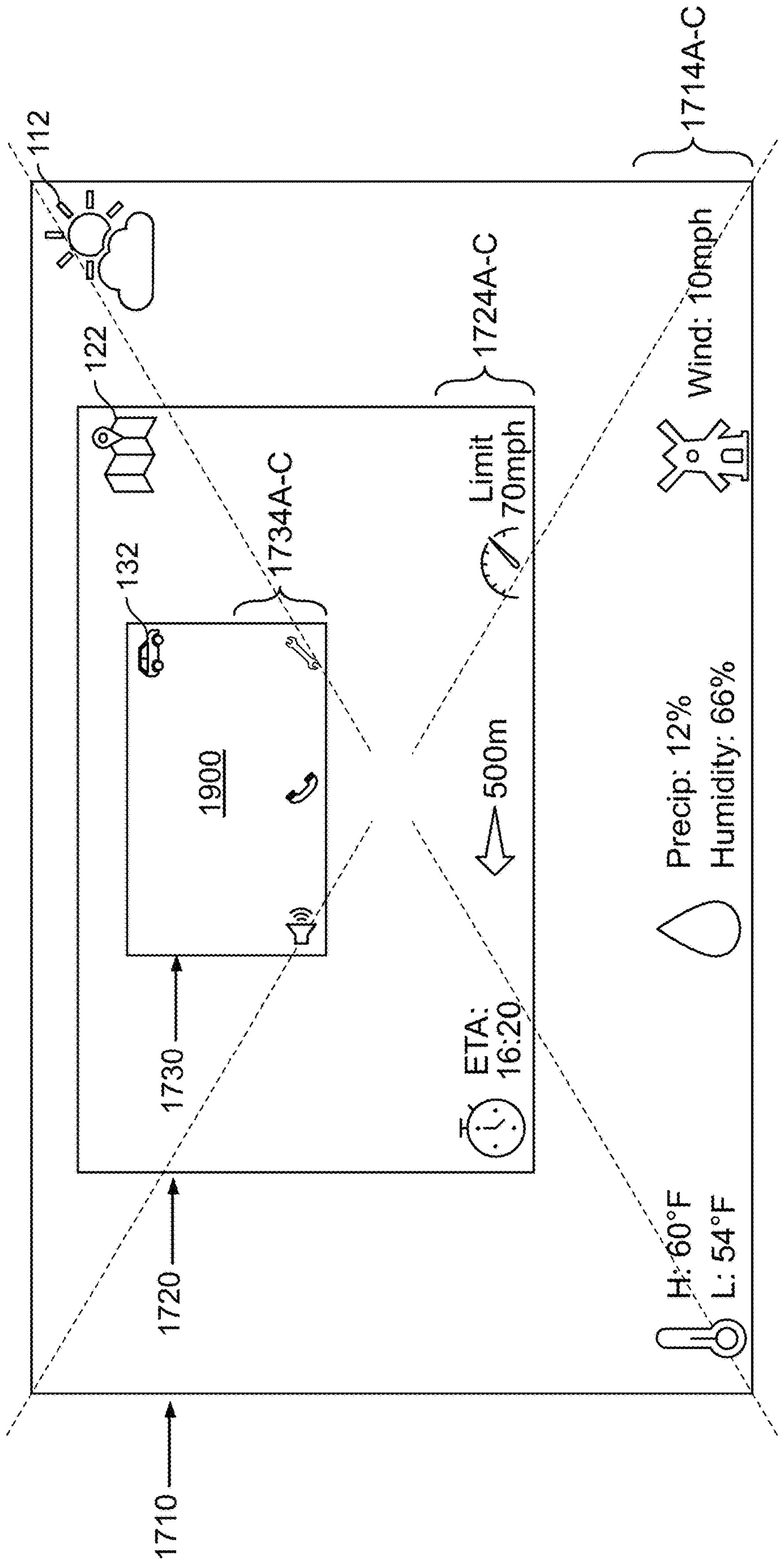

FIGS. 18 and 19 illustrate concentric and non-concentric head-up display views from the perspective of a user, in accordance with some embodiments of the disclosure. FIGS. 18 and 19 comprise the planes 1710-1730 and their respective data. FIG. 18 illustrates a concentric view about a center point 1800. FIG. 19 illustrates a non-concentric view about non-center point 1900.

A second plane, such as planes 1720 may be configured to represent non-essential vehicle information in a fixed location upon the head-up display of the vehicle 1600. For example, the second plane 1720 may describe the time and the ambient temperature. The first plane, for example, plane 1710, can then be configured to describe more important information, relative to the user's current need, such as engine speed and vehicle speed.

In some examples, each of the elements of the plurality of graphical elements 100, and the planes themselves have a configurable location, which can be saved as a preferred location in the head-up display. The preferred location may be based on a preferred gaze location wherein the preferred gaze location corresponds to the center of the road. Hence, the dynamically registered preferred location is displayed in an area on the windscreen head-up display 850 such that the dynamically registered preferred location is at a location of lesser interest than the preferred gaze location where the operator is currently—or should be—gazing (e.g., center of the road) while minimizing head movement and eye saccades for an operator of the vehicle to view the vehicle information contained in the first graphic 910. Hence, the dynamically registered preferred location can be displayed at the preferred gaze location or offset from the preferred gaze location.

Figure 20:
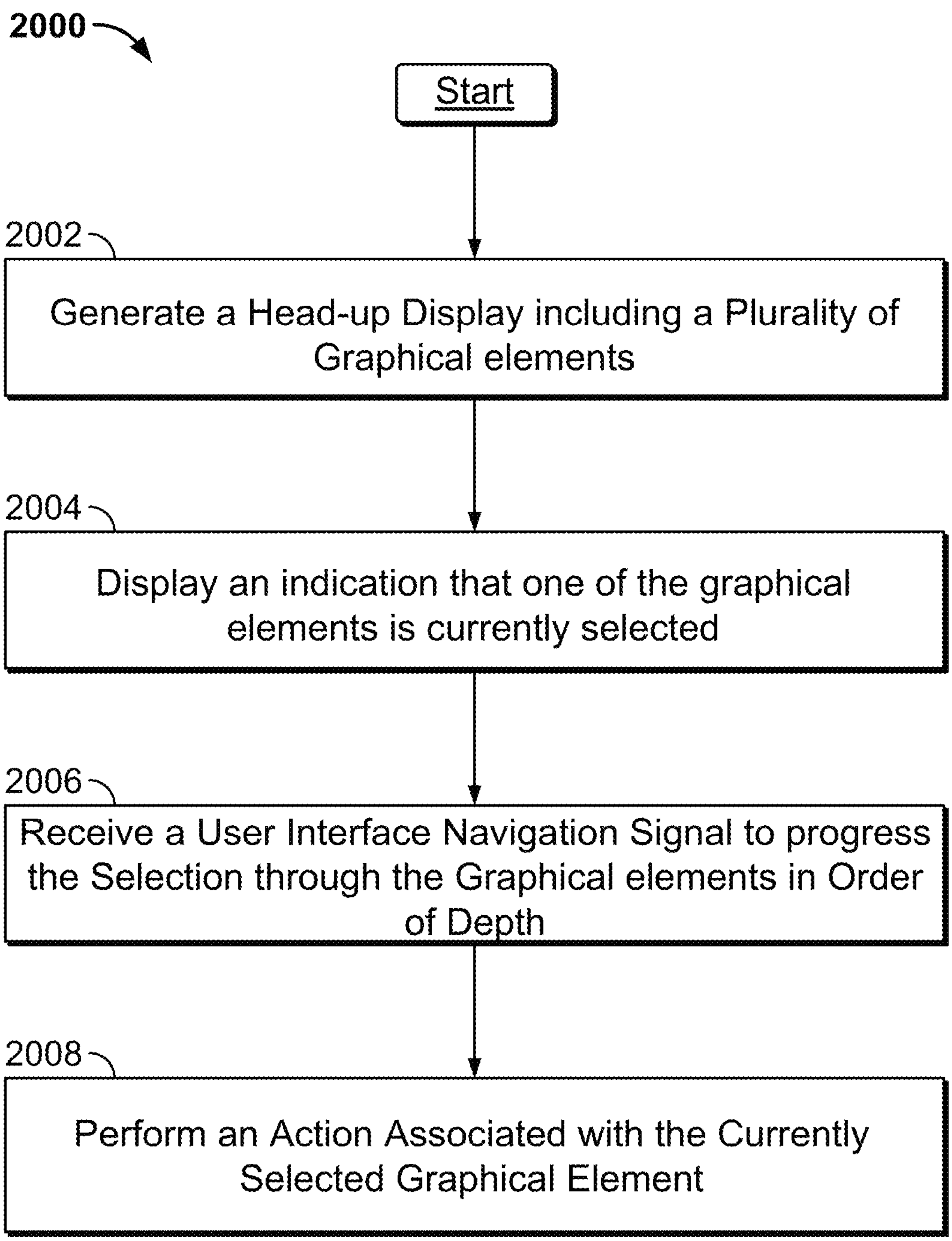
FIG. 20 is an illustrative flowchart of a process for controlling a head-up display, in accordance with some embodiments of the disclosure.

FIG. 20 is an illustrative flowchart of a process for controlling a head-up display device, in accordance with some embodiments of the disclosure. It should be noted that process 2000 or any step of process 2000 could be performed on, or provided by, any of the devices shown in within this disclosure. In addition, one or more steps of process 2000 may be incorporated into or combined with one or more steps of any other process or embodiment (e.g., process 2100, FIG. 21).

At step 2002, the head-up display device generates a head-up display including a plurality of graphical elements. For example, a graphical element may comprise a plurality of pixels arrayed in a two-dimensional matrix displaying information for the user, that is generated on a plane of the user's field of view. Each plane of the display is at a different perceived depth to a user, sometimes referred to as a depth plane. For example, each graphical element is arranged such that, from a user's perspective, each graphical element, or group of graphical elements, has a perceived depth that is different to the next. Accordingly, each graphical element is generated at one of a range of depths on the head-up display.

At step 2004, the head-up display device displays an indication that one of the graphical elements is currently selected. For example, a plane can be highlighted with a marker; a change to, for example, color, contrast, brightness, or the like; a visual non-static indication, such as blinking, flashing, or the like.

At step 2006, the head-up display device receives a user interface navigation signal to rotate the selection through the graphical elements in order of depth in response to user actuation of a navigation control. At step 2008, the head-up display device performs an action associated with the currently selected graphical element in response to user actuation of the user input device.

Figure 21:
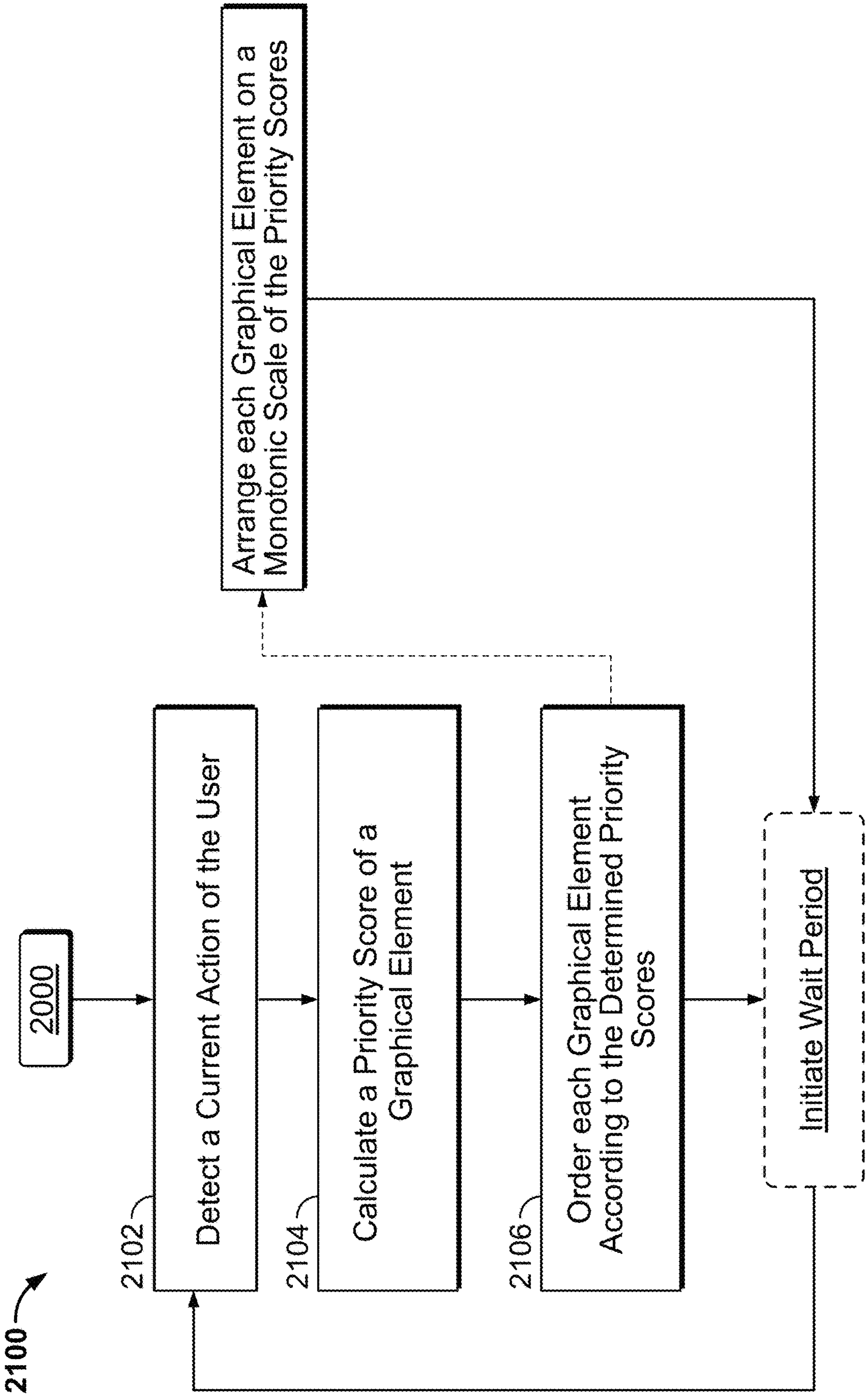
FIG. 21 is an illustrative flowchart of a process for ordering planes of a head-up display according to a priority score, in accordance with some embodiments of the disclosure.

FIG. 21 is an illustrative flowchart of a process for ordering planes of a head-up display according to a priority score, in accordance with some embodiments of the disclosure. It should be noted that process 2100 or any step of process 2100 could be performed on, or provided by, any of the devices shown in within this disclosure. In addition, one or more steps of process 21000 may be incorporated into or combined with one or more steps of any other process or embodiment (e.g., process 2200, FIG. 22).

At step 2102, the head-up display device detects a current action of the user. At step 2104, the head-up display device determines a priority score of each graphical element, based on a current action of the user For example, the priority score determining (or calculation) may be further based on; actively extracting input from the user, interpreting the user's intention, resolving the ambiguity between competing interpretations, requesting and receiving clarifying information if necessary, and performing (i.e., initiating) actions based on distinguished intent. Further, determining the priority score may be carried out, or assisted by, the use of an intelligent automated assistant, configured to carry out any or all of the aforementioned actions.

At step 2106, the head-up display device orders each graphical element according to the determined priority scores. At step 2108, the head-up display device arranges each plane of the display on a monotonic scale (e.g., a logarithmic scale) of the priority scores. At step 2110, a waiting period may be initiated before process 2100 reverts to step 2102. If the waiting period is not initiated, process 2100 may revert to step 21002 immediately or process 2100 may end.

Figure 22:
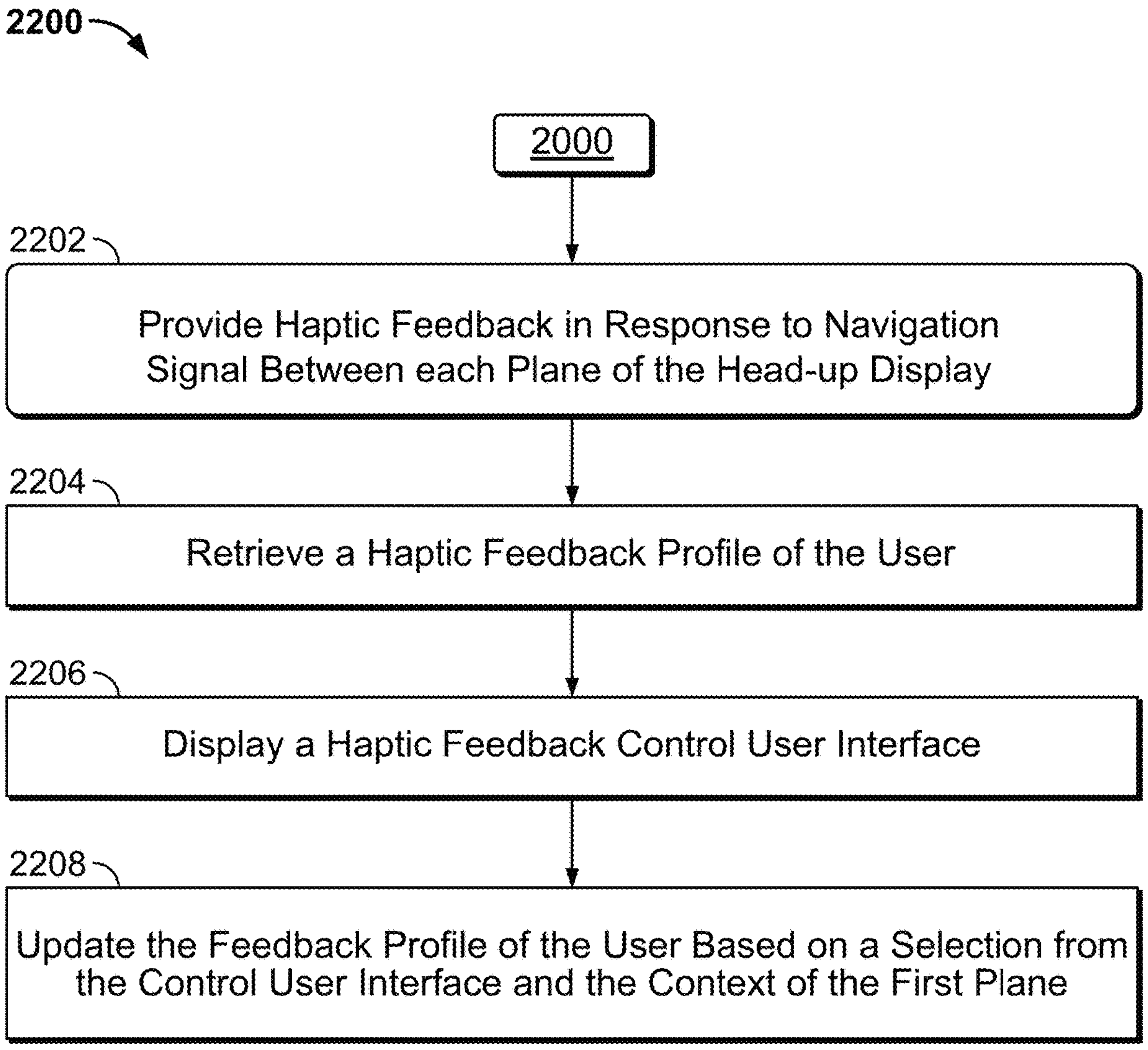
FIG. 22 is an illustrative flowchart of a process for providing haptic feedback to a user of a head-up display, in accordance with some embodiments of the disclosure.

FIG. 22 is an illustrative flowchart of a process for providing haptic feedback to a user of a head-up display, in accordance with some embodiments of the disclosure. It should be noted that process 2200 or any step of process 2200 could be performed on, or provided by, any of the devices shown in within this disclosure. In addition, one or more steps of process 2200 may be incorporated into or combined with one or more steps of any other process or embodiment (e.g., process 2300, FIG. 23).

At step 2202, the head-up display device provides haptic feedback in response to the received user interface navigation signal between each plane of the head-up display. In some examples, the haptic feedback is provided by at least one of vibration, force feedback, air vortex rings, or ultrasound. The majority of vibration-based haptics use a type of eccentric rotating mass actuator, consisting of an unbalanced weight attached to a motor shaft. Force feedback devices typically use motors to manipulate the movement of an item held by the user. Air vortex rings are commonly donut-shaped air pockets made up of concentrated gusts of air. Focused ultrasound beams are often used to create a localized sense of pressure on a finger without touching any physical object.

At step 2204, the head-up display device retrieves a haptic feedback profile of the user. At step 2206, the head-up display device displays a haptic feedback control user interface. At step 2208, the head-up display device updates the feedback profile of the user based on a selection from the control user interface and the context of the first plane.

Figure 23:
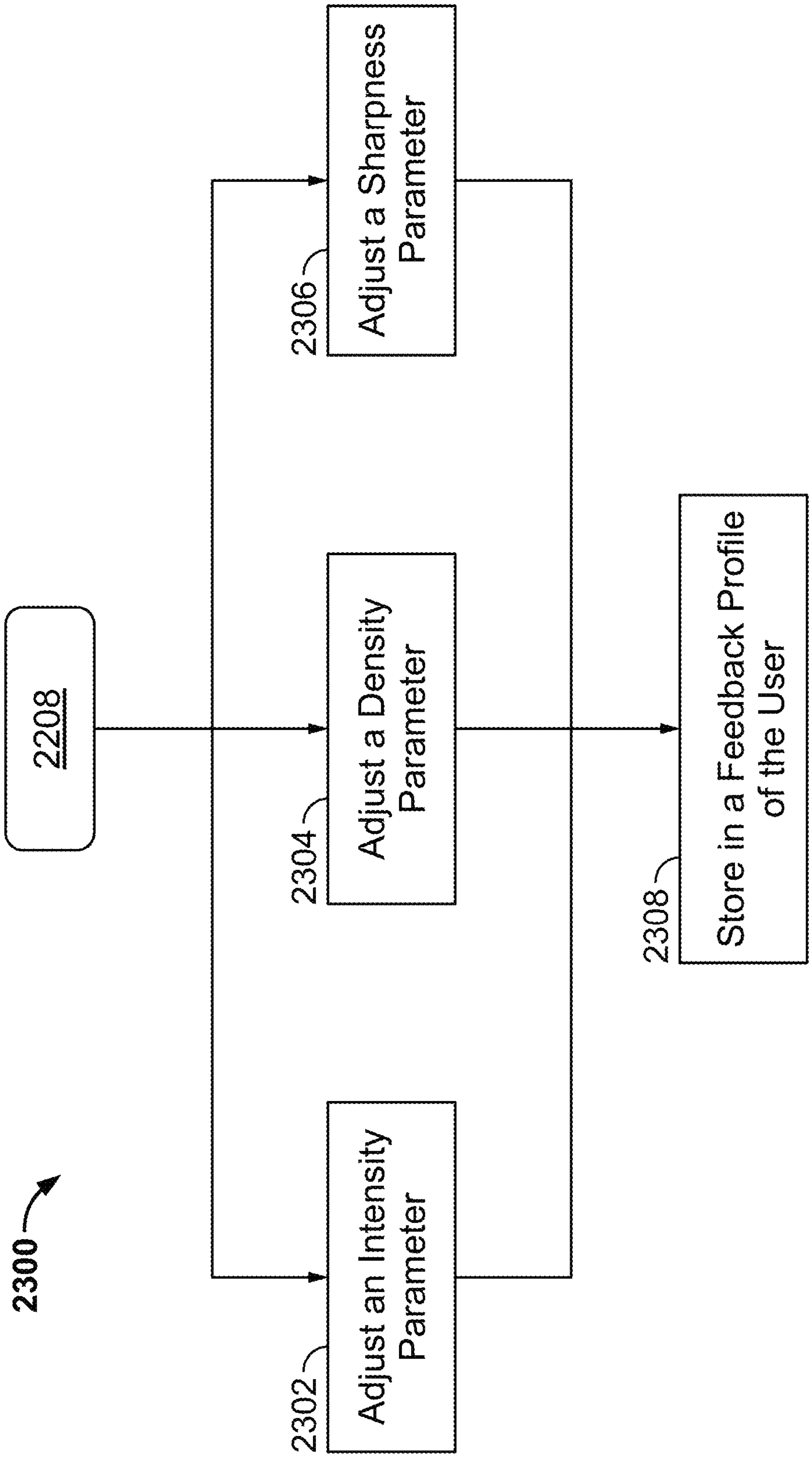
FIG. 23 is an illustrative flowchart of a process for adjusting haptic feedback parameters, in accordance with some embodiments of the disclosure.

FIG. 23 is an illustrative flowchart of a process for adjusting haptic feedback parameters, in accordance with some embodiments of the disclosure. It should be noted that process 2300 or any step of process 2300 could be performed on, or provided by, any of the devices shown in within this disclosure. In addition, one or more steps of process 2300 may be incorporated into or combined with one or more steps of any other process or embodiment (e.g., process 2200, FIG. 22). In some examples, the feedback profile comprises a user preference of at least one of an intensity parameter, a density parameter, or a sharpness parameter. In some examples, the method further comprises adjusting at least one of; an intensity parameter, a density parameter, or a sharpness parameter. For example, the user may adjust the intensity of a haptic feedback actuator within the user input device to be less intense. In response to the user adjusting such a parameter, this information can be used to update the user feedback profile.

At step 2302, the head-up display device adjusts an intensity parameter. At step 2304, the head-up display device adjusts a density parameter. At step 2304, the head-up display device adjusts a sharpness parameter.

Figure 24:
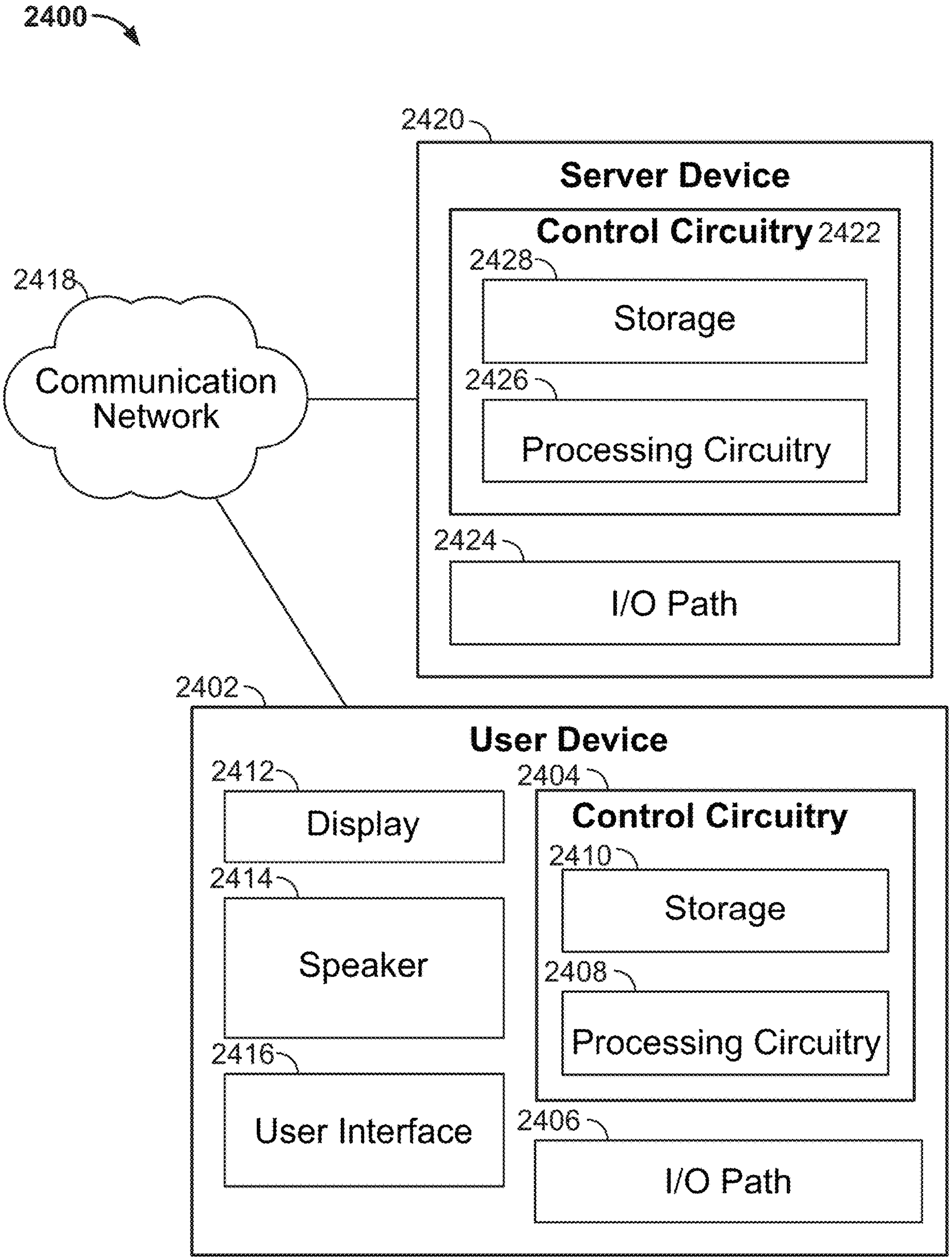
FIG. 24 is an illustrative topology of equipment (or computing configuration) programmed and configured for navigating media content, according to some examples of the disclosure.

FIG. 24 is an illustrative topology of equipment (or computing configuration) programmed and configured for navigating media content, according to some examples of the disclosure. FIG. 24 shows an illustrative block diagram of a computing configuration 2400 that may include the head-up display device/system disclosed herein. Computing configuration 2400 includes a user device 2402. In some embodiments, the user device 2402 may include control circuitry 2404 and an input/output (I/O) path 2406. Control circuitry 2404 may include processing circuitry 2408, and storage 2410 (e.g., RAM, ROM, hard disk, a removable disk, etc.). I/O path 2406 may provide device information, or other data, over a local area network (LAN) or wide area network (WAN), and/or other content and data to control circuitry 2404. Control circuitry 2404 may be used to send and receive commands, requests, signals (digital and analog), and other suitable data using I/O path 2406. I/O path 2406 may connect control circuitry 2404 (and specifically processing circuitry 2408) to one or more communications paths.

User device 2402 may include a head-up display 2412 and a speaker 2414 to display content visually and audibly. In addition, to interact with a user, user device 2402 includes a user interface 2416 (which may be used to interact with the plurality of graphical elements 100 disclosed herein). The user interface 2416 may include a scroll wheel, a physical button, a switch, a touchpad, a direct-drive motor, or a trigger. The user interface 2416 is connected to the I/O path 2406 and the control circuitry 2404.

Control circuitry 2404 may be based on any suitable processing circuitry such as processing circuitry 2408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores), a cloud based compute unit, or even a supercomputer. In some examples, processing circuitry may be distributed across multiple separate processors or processing units, for example, multiple of the same type of processing units (e.g., two Intel Core i7 processors) or multiple different processors (e.g., an Intel Core i5 processor and an Intel Core i9 processor).

A memory may be an electronic storage device provided as storage 2410, which is part of control circuitry 2404. Storage 2410 may store instructions that, when executed by processing circuitry 2408, perform the processes described herein. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Nonvolatile memory may also be used (e.g., to launch a boot-up routine and other instructions). The user device 2402 may be a smartphone, a tablet, an e-reader, a laptop, a smart TV, etc.

Computing configuration 2400 may also include a communication network 2418 and a server device 2420. The user device 2402 may be coupled to the communication network 2418 to communicate with the server device 2420. The communication network 2418 may be one or more networks including the Internet, a mobile phone network, mobile voice or data network (e.g., a BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols), mesh network, peer-to-peer network, cable network, or other types of communication network or combinations of communication networks.

In some examples, server device 2420 may include control circuitry 2422 and an input/output (I/O) path 2424. Control circuitry 2404 may include processing circuitry 2426, and storage 2428, which may similar to those already discussed in relation to the user device 2402. Server device 2420 may be a content provider for the user device 2402, such as plane data or information, plane configuration, user haptic feedback profile data, etc.

In some embodiments, the content navigation system comprises the user device 2402, whether the content is being streamed from the server or being retrieved from the storage 2410. Alternatively, the content navigation system is distributed over the user device 2402 and the server device 2420.

Figure 25:
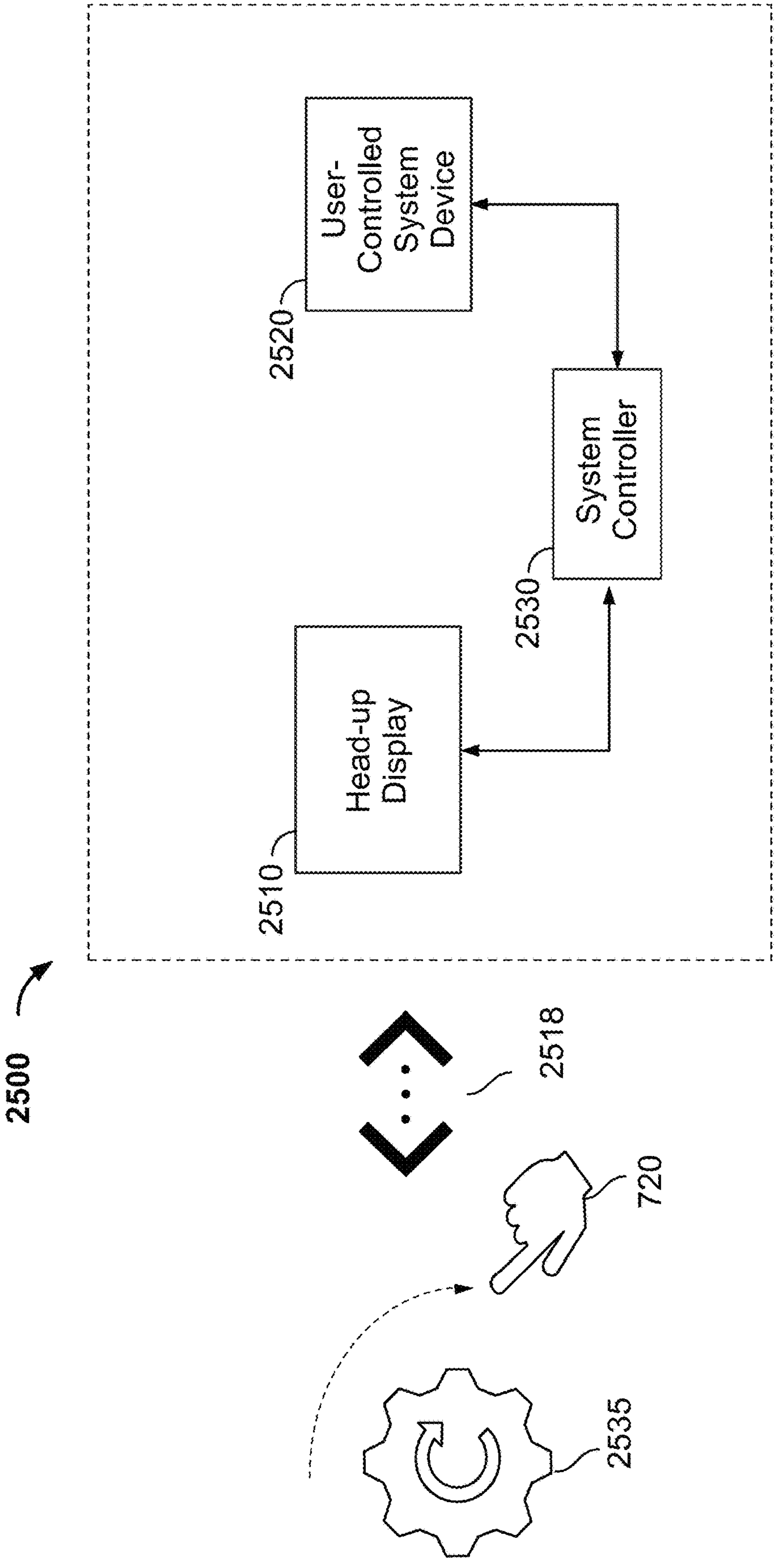
FIG. 25 illustrates an exemplary head-up display apparatus, in accordance with some examples of the disclosure.

FIG. 25 illustrates an exemplary head-up display apparatus, in accordance with some examples of the disclosure. The head-up display apparatus 2500 comprises a head-up display 2510, a user-controlled system device 2520, and a system controller 2530. The head-up display apparatus may communicate with a user input device 2535, such as touchpad, trigger, button, switch, scroll wheel, wheel, microphone for receiving voice inputs, or other input device. In some examples, the head-up display 2510 is configured to display a plurality of graphical elements, each graphical element being displayed at one of a range of perceived depths on the head-up display. In addition, the head-up display 2510 is also configured to display an indication that one of the graphical elements is currently selected. To have graphical elements appear at different perceived depths, each graphical element may be augmented on to a field of view of the user at different sizes corresponding to the environment in the user's field of view. In addition, the graphical elements may be made at different perceived focal points, and are brought into focus when a vergence of the user's eye(s) are detected. For example, the movement of the pupils of the eyes towards or away from one another during focusing is detected and a corresponding graphical element is brought into focus. The system controller 2530 may optionally be communication with the additional user device 2535.

In some examples, the user-controlled system device 2520 is coupled to the system controller 2530 and, in some examples, the head-up display 2510 (not shown). In some examples, the user-controlled system device 2520 is adapted to receive a user interface navigation signal, from a user input device, to progress the selection through the graphical elements in order of depth in response to user actuation of a navigation control.

In some examples, the system controller 2530 is communicatively coupled to the head-up display 2510 and the user-controlled system device 2520. In some examples, the system controller 2530 is configured to perform an action associated with the currently selected graphical element in response to user actuation of an activation control of the user input device or the user-controlled system device 2520. In some examples, the system controller 2530 instructs the head-up display to display a plurality of graphical elements, each graphical element being displayed at one of a range of perceived depths on the head-up display, and display an indication that one of the graphical elements is currently selected. In some examples, the system controller 2530 is configured to progress the selection through the graphical elements in order of depth in response to user actuation of a navigation control.

In some examples, the head-up display apparatus may further comprise a transceiver module (not shown) which communicates with a user input device, such as user input device 710 of FIG. 7, or a second user device 2535 via communication link 2518. In some examples, the system controller 2530 comprises the transceiver module. In some examples, the second user device 2535 may be the user input device as describe with reference to FIG. 8. Furthermore, the second user device 2535 may indeed be a separate functionality of the user input device 710; in which case user input device 710 and second device 2535 may be thought of as the same device, but with two modalities of operation. The communication link 2518 between the transceiver module (or the system controller 2530) and the user input device 710 or second user device 2535 may comprise a physical connection, facilitated by an input port such as a 3.5 mm jack, RCA jack, USB port, ethernet port, or any other suitable connection for communicating over a wired connection; or may comprise a wireless connection via BLUETOOTH, Wi-Fi, WiMAX, Zigbee, GSM, UTMS, CDMA, TDMA, 3G, 4G, 4G LTE, 5G, or other wireless transmissions as described by the relevant IEEE wireless communication standard protocols.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment appropriately, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of providing a user interface, the method comprising:

generating, on a head-up display device, a head-up display including a plurality of graphical elements, each of the plurality of graphical elements being displayed at a respective first depth of a range of perceived depths on the head-up display;

determining a first order for each of the plurality of graphical elements, wherein at least one graphical element of the plurality of graphical elements is at least partially obscured;

determining a respective priority score for each of the plurality of graphical elements based on one or more user actions;

displaying an indication that one of the plurality of graphical elements is currently selected;

receiving a user interface navigation signal, from a user input device, to progress the selection through the plurality of graphical elements in order of depth in response to user actuation of a navigation control;

based at least in part on progressing the selection through the plurality of graphical elements in order of depth, and based at least in part on the respective priority scores for each of the plurality of graphical elements:

displaying, at the head-up display device, the plurality of graphical elements in a second order, wherein the second order is different than the first order, and wherein the second order displays the at least one graphical element of the plurality of graphical elements unobscured; and displaying, at the head-up display device, each of the plurality of graphical elements at a respective second depth of the range of perceived depths, wherein the respective second depth is different than the respective first depth for at least one of the plurality of graphical elements; and performing an action associated with the currently selected graphical element in response to user actuation of an activation control of the user input device, wherein the action comprises enabling interaction with an icon on the selected graphical element.

2. The method of claim 1, further comprising:

selecting a first plane of a plurality of depth planes comprising at least one graphical element to be designated the position of a selectable item; and receiving a selection signal, from the user input device, of a graphical element on said designated plane.

3. The method of claim 2, further comprising:

in response to receiving the selection signal, entering a menu of the graphical element.

4. The method of claim 1, wherein the number of the plurality of graphical elements to be generated is greater than a number of displayable graphical elements on the head-up display device; and wherein progressing through the selection through the plurality of graphical elements comprises selecting a subset of the plurality of graphical elements to be displayed on the head-up display.

5. The method of claim 4, further comprising:

receiving a second user interface navigation signal;

wherein the second user interface navigation signal selects a second subset of the plurality of graphical elements to be displayed on the head-up display.

6. The method of claim 1, wherein the user input device is at least one of a wheel, a physical button, a switch, a touchpad, a direct-drive motor, or a trigger.

7. The method of claim 1, wherein the head-up display is replaced by a non-mobile or fixed display device.

8. The method of claim 1, wherein the user input device is a stepped control device, wherein each step corresponds to progression to an adjacent depth of the head-up display.

9. The method of claim 1, wherein the user input device comprises software-controllable detents, wherein each detent corresponds to a progression to an adjacent depth of the head-up display.

10. The method of claim 1, wherein the user input device comprises a controllable haptic actuator, wherein each haptic pulse corresponds to a progression to an adjacent depth of the head-up display.

11. The method of claim 9, further comprising:

providing haptic feedback in response to receiving user interface navigation signal between each plane of the head-up display.

12. The method of claim 1, wherein each graphical element of the display has a different interaction context.

13. The method of claim 1, further comprising:

ranking each graphical element based on an action of a user; and arranging each graphical element of the display at a perceived depth based on the ranking.

14. The method of claim 1, further comprising:

calculating a priority score of a graphical element based on an action of the user;

ordering each graphical element according to the calculated priority scores; and arranging each graphical element of the display at a perceived depth based on a monotonic scale of the priority scores.

15. The method of claim 1, further comprising:

retrieving, from a storage device, a haptic feedback profile of the user.

16. The method of claim 15, further comprising:

displaying, based on the context of the first plane, a haptic feedback control user interface; and updating the feedback profile of the user based on a selection from the control user interface and the context of the first plane.

17. The method of claim 15, the method further comprising:

wherein the feedback profile comprises a user preference of at least one of an intensity parameter, a density parameter, or a sharpness parameter; and adjusting at least one of an intensity parameter, a density parameter, or a sharpness parameter.

18. A non-transitory computer-readable medium, having instructions recorded thereon for providing a user interface, the instructions comprising:

generating, on a head-up display device, a head-up display including a plurality of graphical elements, each of the plurality of graphical elements being generated at a respective first depth of a range of perceived depths on the head-up display;

determining a first order for each of the plurality of graphical elements, wherein at least one graphical element of the plurality of graphical elements is at least partially obscured;

determining a respective priority score for each of the plurality of graphical elements based on one or more user actions;

displaying an indication that one of the plurality of graphical elements is currently selected;

receiving a user interface navigation signal, from a user input device, to progress the selection through the plurality of graphical elements in order of depth in response to user actuation of a navigation control;

based at least in part on progressing the selection through the plurality of graphical elements in order of depth, and based at least in part on the respective priority scores for each of the plurality of graphical elements:

displaying, at the head-up display device, the plurality of graphical elements in a second order, wherein the second order is different than the first order, and wherein the second order displays the at least one graphical element of the plurality of graphical elements unobscured; and displaying, at the head-up display device, each of the plurality of graphical elements at a respective second depth of the range of perceived depths, wherein the respective second depth is different than the respective first depth for at least one of the plurality of graphical elements; and performing an action associated with the currently selected graphical element in response to user actuation of an activation control the user input device, wherein the action comprises enabling interaction with an icon on the selected graphical element.

19. The method of claim 1, further comprising:

determining a perceived distance between each of the plurality of graphical elements, wherein the perceived distance between each of the plurality of graphical elements is based on the respective priority scores.

20. The method of claim 19, wherein the perceived distance between two graphical elements of the plurality of graphical elements is closer when the respective priority scores of the two graphical elements are more similar to each other, and is farther when the respective priority scores of the two graphical elements are less similar to each other.

* * * * *